(12) United States Patent
Huston et al.

(10) Patent No.: US 10,900,185 B1
(45) Date of Patent: Jan. 26, 2021

(54) MODULAR CONTAINMENT SYSTEM

(71) Applicant: POLYSTAR INC., Solon, OH (US)

(72) Inventors: David Huston, Hudson, OH (US); Robert Huston, Hudson, OH (US); Robert L. Nightwine, Chagrin Falls, OH (US); Robert S. Nightwine, Chagrin Falls, OH (US); Mark Pethtel, Sagamore Hills, OH (US)

(73) Assignee: POLYSTAR INC., Stow, OH (US)

( * ) Notice: Subject to any disclaimer, the term of this patent is extended or adjusted under 35 U.S.C. 154(b) by 0 days.

(21) Appl. No.: 16/992,680

(22) Filed: Aug. 13, 2020

Related U.S. Application Data

(60) Provisional application No. 62/887,194, filed on Aug. 15, 2019.

(51) Int. Cl.
*E02B 3/10* (2006.01)
*E04H 9/14* (2006.01)

(52) U.S. Cl.
CPC ............. *E02B 3/106* (2013.01); *E04H 9/145* (2013.01)

(58) Field of Classification Search
CPC ......... E02B 3/106; E04H 9/145; E01F 15/086
See application file for complete search history.

(56) References Cited

U.S. PATENT DOCUMENTS

| | | | | |
|---|---|---|---|---|
| 4,681,302 A * | 7/1987 | Thompson | ............ | E01F 8/0035 256/13.1 |
| 4,765,775 A * | 8/1988 | Kroger | ................... | B65D 90/24 405/129.8 |
| 4,978,245 A * | 12/1990 | White | ................... | E01F 15/086 116/63 P |
| 5,924,461 A * | 7/1999 | Shaw | .................... | F16N 31/006 141/86 |
| 5,988,934 A * | 11/1999 | Wasserstrom | ........ | E01F 15/083 256/13.1 |
| 6,059,491 A * | 5/2000 | Striefel | ................. | E01F 15/086 256/13.1 |
| 6,079,904 A * | 6/2000 | Trisl | ........................ | E02B 3/106 405/107 |
| 6,164,870 A * | 12/2000 | Baruh | ..................... | E02B 3/108 405/114 |
| 6,413,014 B1 * | 7/2002 | Melin | ................... | E02D 29/025 405/107 |
| 6,840,711 B1 * | 1/2005 | Martinez | ................. | E02B 3/106 405/107 |

(Continued)

*Primary Examiner* — Benjamin F Fiorello
(74) *Attorney, Agent, or Firm* — Pearne & Gordon LLP

(57) ABSTRACT

A modular dike or barrier system includes interconnectable side and corner members having front and rear walls with integrally formed support ribs. Upper, base and side end walls connect and are integral with the front and rear walls. Each of the front and rear walls extends at an acute angle relative to the base wall that is configured to rest against a substratum. The inward acute angle allows for containing and redirecting a surge flow inwardly within an area contained by the barrier system in a direction away from the members. The members are generally plate-like and are configured to allow for horizontal stacking on the substratum. Members can include a selectively collapsible support assembly configured to be retained at central bodies of the respective members and to limit interference during stacking and transport of the members.

20 Claims, 18 Drawing Sheets

(56) References Cited

U.S. PATENT DOCUMENTS

| | | | | |
|---|---|---|---|---|
| 7,198,426 B2* | 4/2007 | Kang | ..................... | E01F 15/086 |
| | | | | 404/6 |
| 7,234,275 B1* | 6/2007 | Haggy | .................. | E01F 13/022 |
| | | | | 160/135 |
| 7,614,825 B2* | 11/2009 | Kroger | .................... | B65D 90/24 |
| | | | | 220/476 |
| 8,376,651 B2* | 2/2013 | Kulp | ..................... | E01F 15/088 |
| | | | | 404/6 |
| 8,777,510 B2* | 7/2014 | Maus | .................... | E01F 15/088 |
| | | | | 404/6 |
| 8,864,411 B2* | 10/2014 | Taylor | .................... | E02B 3/108 |
| | | | | 405/114 |
| 8,915,040 B2* | 12/2014 | James | .................... | E01F 15/086 |
| | | | | 52/588.1 |
| 9,181,669 B2* | 11/2015 | Stroup | .................... | E02B 7/005 |
| 9,279,271 B2* | 3/2016 | McDowell | .............. | E04H 17/00 |
| 9,688,468 B1 | 6/2017 | Pethtel et al. | | |
| 9,821,216 B2* | 11/2017 | Kurtin | .................... | A63C 19/10 |
| 10,415,210 B2* | 9/2019 | Powell | .................. | E02D 31/004 |
| 10,458,084 B2* | 10/2019 | Nero | ..................... | F16M 11/22 |
| 10,577,827 B2* | 3/2020 | Kurtin | .................... | A63C 19/10 |
| 2007/0206990 A1* | 9/2007 | Yodock, III | .......... | E01F 15/086 |
| | | | | 404/6 |
| 2009/0060650 A1* | 3/2009 | Kulp | ..................... | E01F 15/086 |
| | | | | 404/6 |
| 2010/0129156 A1* | 5/2010 | Taylor | .................... | E02B 3/108 |
| | | | | 405/114 |
| 2011/0052323 A1* | 3/2011 | Mun | ..................... | E02B 3/106 |
| | | | | 405/114 |
| 2013/0071188 A1* | 3/2013 | Taylor | .................... | E02B 3/106 |
| | | | | 405/114 |
| 2013/0105475 A1* | 5/2013 | Marshall | ............... | B65D 90/24 |
| | | | | 220/4.12 |
| 2014/0314479 A1* | 10/2014 | Stephens | ............... | E01F 15/086 |
| | | | | 404/6 |

* cited by examiner

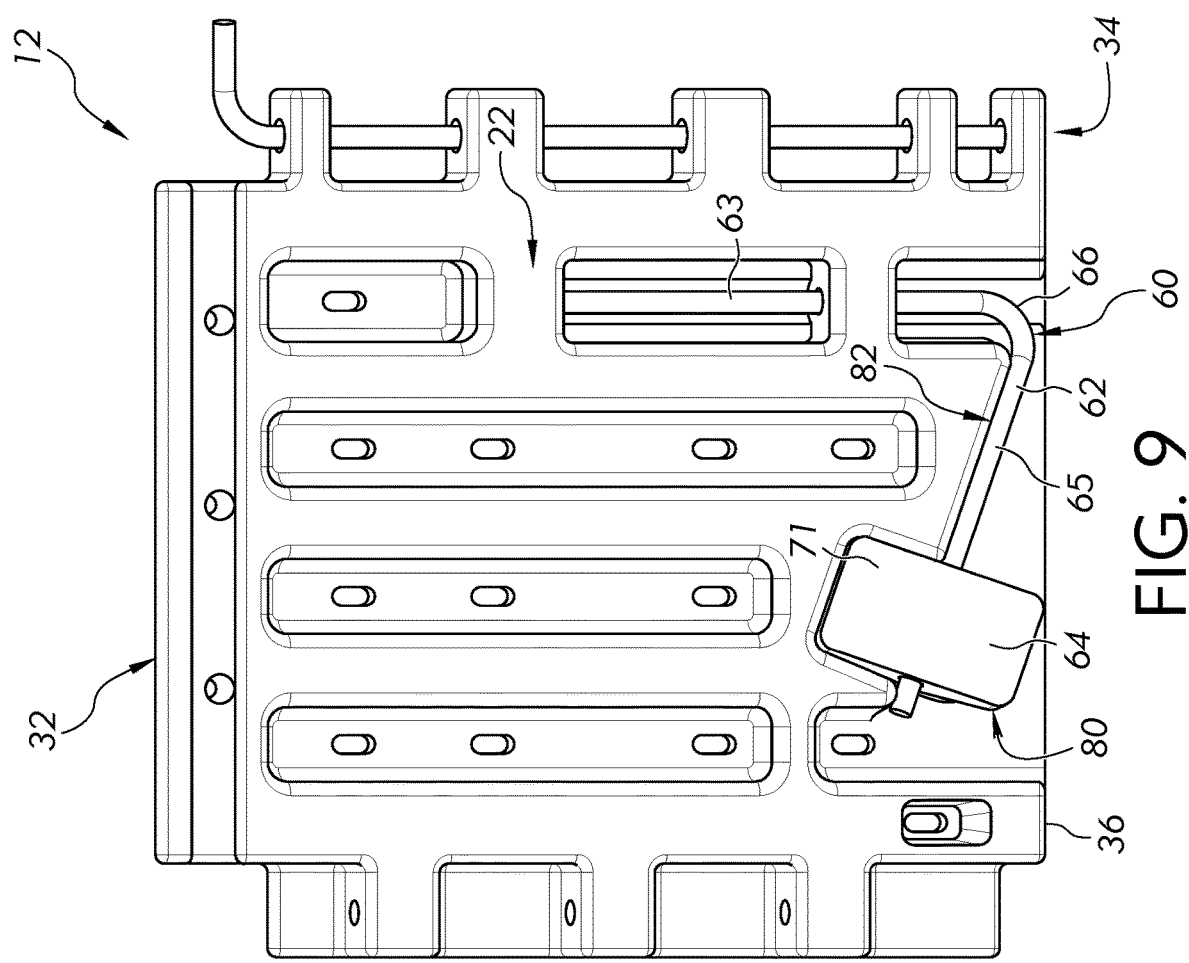

MODULAR CONTAINMENT SYSTEM

RELATED APPLICATIONS

This application claims the benefit of U.S. provisional application No. 62/887,194 having a filing date of Aug. 15, 2019, the entire disclosure of which is hereby incorporated herein by reference.

FIELD OF THE INVENTION

This application relates generally to a fluid containment systems for redirecting and containing a fluid flow, break or surge, and more particularly, to a modular containment system capable of being transported in pieces and subsequently erected at a desired site for fluid containment purposes.

BACKGROUND

Containment systems can be utilized for reducing or altogether preventing accidental spill of materials being stored or processed. For example, such containment systems can be disposed externally about a general location of storage or processing of a material, such as a hazardous material. It is useful if such containment systems may be modular to allow for various sizing of an erected system, and if such modularity also allows for transport of the containment systems broken down into respective members.

Prior art barrier assemblies can be heavy and raise transportation considerations, especially for remote installations and/or tight-fitting industrial installations having tortuous paths to the location where the systems are to be erected. In such cases, ease of manipulation for manual transportation and installation is desirable. In all cases, it is desirable that the containment system may be quickly and easily deployed and assembled. This is particularly true in the case of military applications wherein assembly, disassembly and transportation of the system may be provided at different locations by different personnel. Such containment systems also should have interconnection capable of maintaining stability, such as resisting an impacting surge flow of accidentally released material.

BRIEF SUMMARY

The present invention provides a modular dike or barrier system having interconnectable side and corner members. The members are generally hollow and have opposed major front and rear side walls with integrally formed support ribs. Upper, lower and side end walls connect and are integral with the major front and rear side walls. Each of the front and rear side walls extends at an acute angle relative to the lower or base wall that is configured to rest against a substratum. The acute angle allows for containing and redirecting a surge flow away from the barrier system. The side members and the corner members are generally plate-like and thus are configured to allow for horizontal stacking of the side members, the corner members, and the side members and the corner members together. Side members may include a selectively collapsible support assembly configured to be retained at a central body of the side member and configured to limit interference during stacking and transport.

According to one aspect, a fluid surge resistant modular barrier system for retaining a fluid is provided. The modular barrier system includes a plurality of members configured to be connected to one another to form a barrier. The plurality of members each include a front wall and an opposed rear wall. Each of the front wall and the rear wall have integrally formed support ribs. The plurality of members each also include an upper wall, a base wall and opposing side end walls extending between the front wall and the rear wall. The base wall is configured to rest against a substratum. Faces of the front wall and the rear wall of each of the plurality of members are contoured to allow an adjacent member to be generally parallel to the substratum when the plurality of members are stacked upon one another on the substratum.

According to another aspect, a fluid surge resistant modular barrier system for retaining a fluid is provided. The modular barrier system includes a plurality of side members each having a central body extending laterally between outwardly extending mating teeth at opposed side ends of the central body, wherein the central body includes a front wall and a rear wall that extend at a first acute angle from a base wall. The base wall is configured to engage a substratum to support the side member at the first acute angle relative to the substratum. The modular barrier system further includes a plurality of corner members each having a triangular shaped body with outwardly extending mating teeth at opposed side ends of the body. The body has a front wall and a rear wall extending at a second acute angle from a base wall. The base wall is configured to engage a substratum to support the body at the second acute angle relative to the substratum.

The foregoing and other features of the invention are hereinafter described in greater detail with reference to the accompanying drawings.

BRIEF DESCRIPTION OF THE DRAWINGS

The accompanying drawings, which are not necessarily to scale, show various aspects of the disclosure.

FIG. 9 is a rear view of the side member of FIG. 4, showing the support assembly in a stowed position on the central body of the side member.

DETAILED DESCRIPTION

The present disclosure relates generally to secondary containment systems typically used in connection with hazardous materials or other materials to be isolated from the environment. Such containment systems are modular and include both side and corner members that are interconnectable to form a barrier or a dike wall, which barrier can be closed, and which surrounds a primary container or structure otherwise isolating a material to be contained. The barrier or dike system 10 is used to reduce escape of, or to altogether contain, a flow of the material that is released. For example, steel drum storage of hazardous materials may require secondary containment under applicable environmental regulations, such as disposed about such steel drum storage or general location. Military fuel storage, manufacturing chemicals, and healthcare related fluids may be provided in one or more primary containers surrounded by secondary containment systems. In other uses, the containment systems described herein may be used to restrict fluid flows of other origins such as of a flood or other disaster resulting in an unregulated or diverted flow of fluid.

Figure 1A:
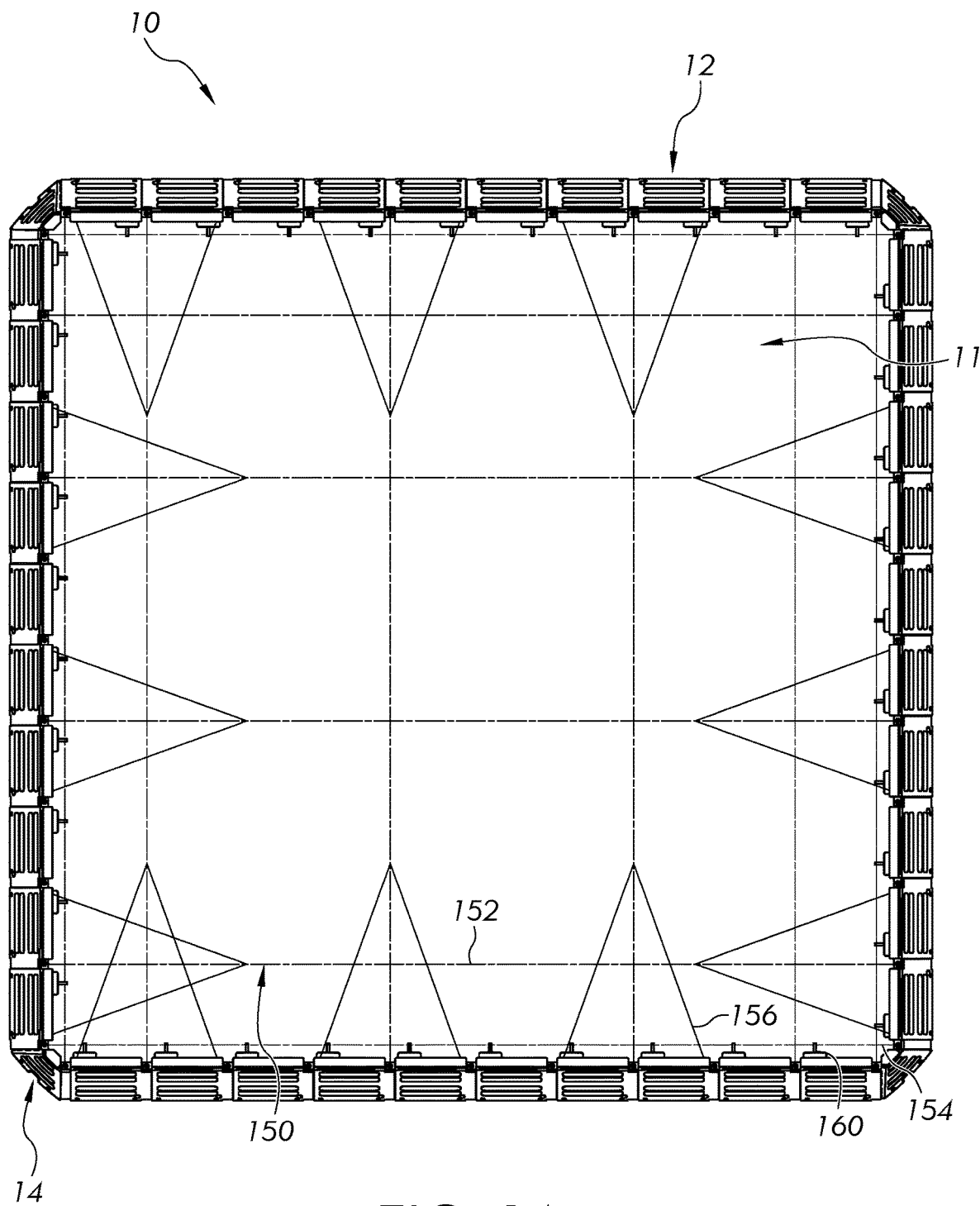
FIG. 1A is a top perspective view of one embodiment of a barrier system according to the present invention wherein the barrier system includes four corner members, ten side members at each side disposed between a respective pair of corner members, and an area to be contained that is bounded by the barrier system.
Figure 18:
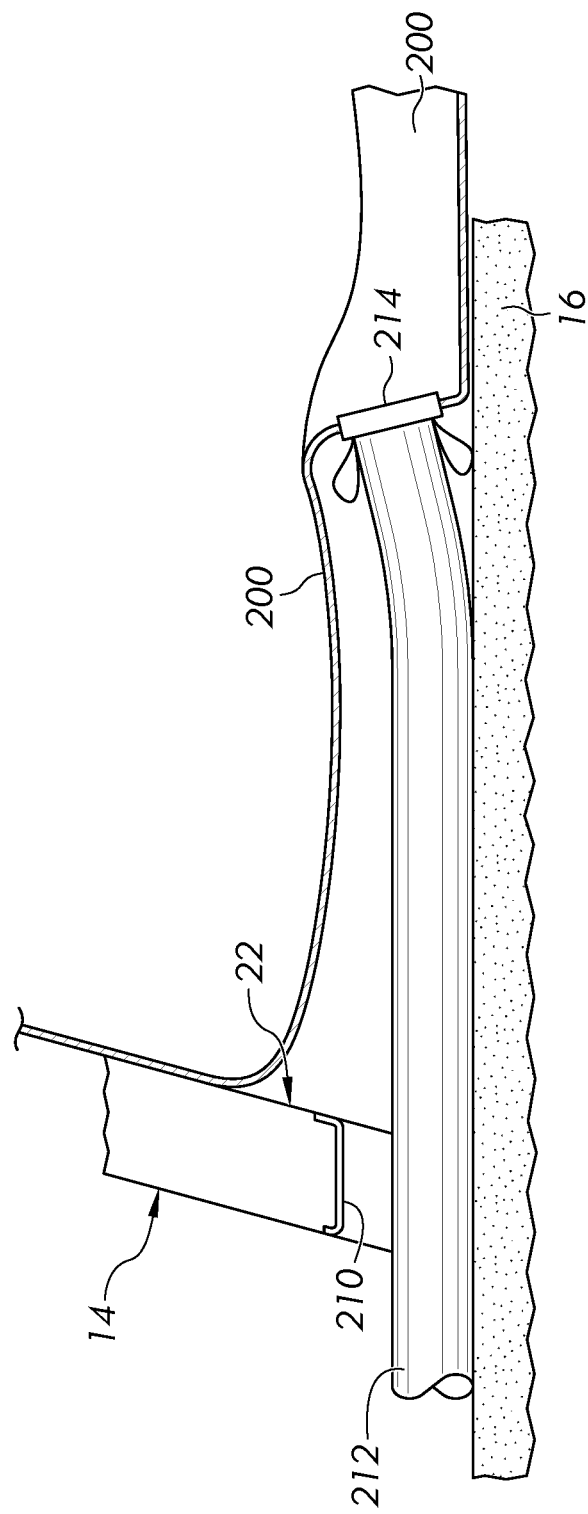
FIG. 18 is a fragmentary schematic view taken along the line A-A of FIG. 10 including a duct 212 extending through a tunnel drain opening formed in a bottom of a corner member.

Referring now to FIG. 1A, one embodiment of a barrier system 10 that bounds an area 11 to be contained is illustrated. The barrier or dike system 10 of FIG. 1A is provided such as for surrounding a primary container, such as a flexible bladder or a storage tank (not shown) that is disposed in area 11. (See, FIG. 18 showing a portion of the bladder liner 200.) In some embodiments, such container may include a chemical, such as fuel, lubricants, solvents, reactants, or other fluid, that is to be isolated from the environment. The barrier system 10 will have a generally rectangular configuration, such as having somewhat beveled corners, though still appearing as a rectangle to an observer.

The system 10 bounds the area 11 with both side members 12 and corner members 14 being inter-engageable and connectable with one another. Generally, these side members 12 and corner member 14 are configured to be selectively interlocked such as to prevent removal relative to one another, and to support one another upon upright erection on a substratum 16, or surface of the ground. Any suitable number of side members 12 may be interlocked with one another between a pair of corner member 14 also being interlocked with adjacent of the side members 12. See also, FIGS. 2A-3B, showing a portion of the system 10 of FIG. 1A.

As shown in FIG. 1A, the system 10 includes a cable assembly 150 for supporting the side members 12 and corner members 14 in respective upright positions. The cable assembly 150 includes a plurality of central cables 152 extending between opposing sides of the system 10, the sides extending between the corner members 14. The central cables 152 form right angles with one another within the area 11. Also included are a plurality of inner peripheral cables 154 extending along an inner periphery of any particular side of the system 10. The inner peripheral cables 154 are spaced closer to the side members 12 than the central cables 152. A plurality of support cables 156 extend between the side members 12 and the central cables 152 at angles transverse to the central cables 152.

Figure 1B:
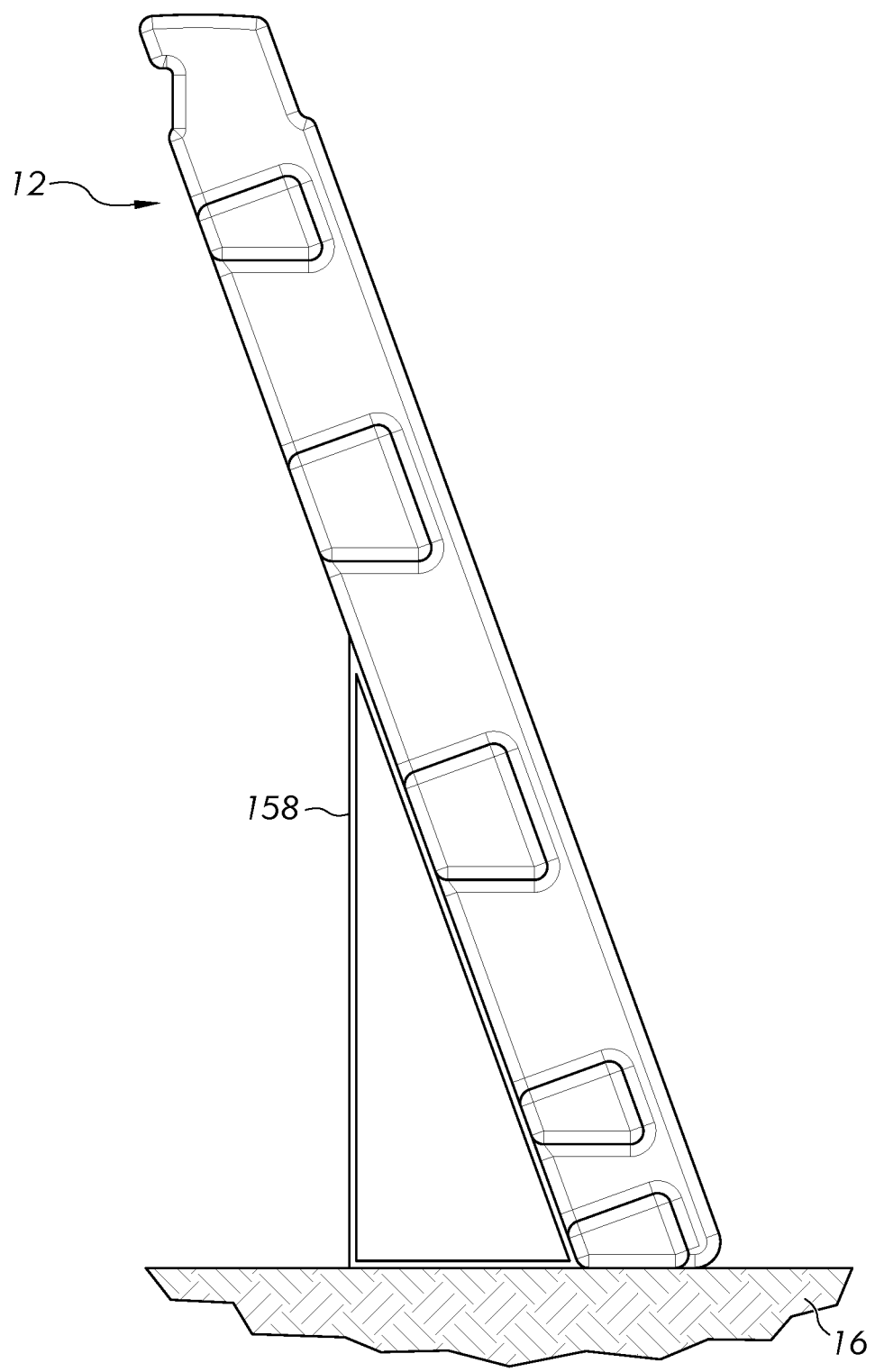
FIG. 1B is a side end view of a side member of the system of FIG. 1A, showing an option portion of a cable assembly.
Figure 2A:
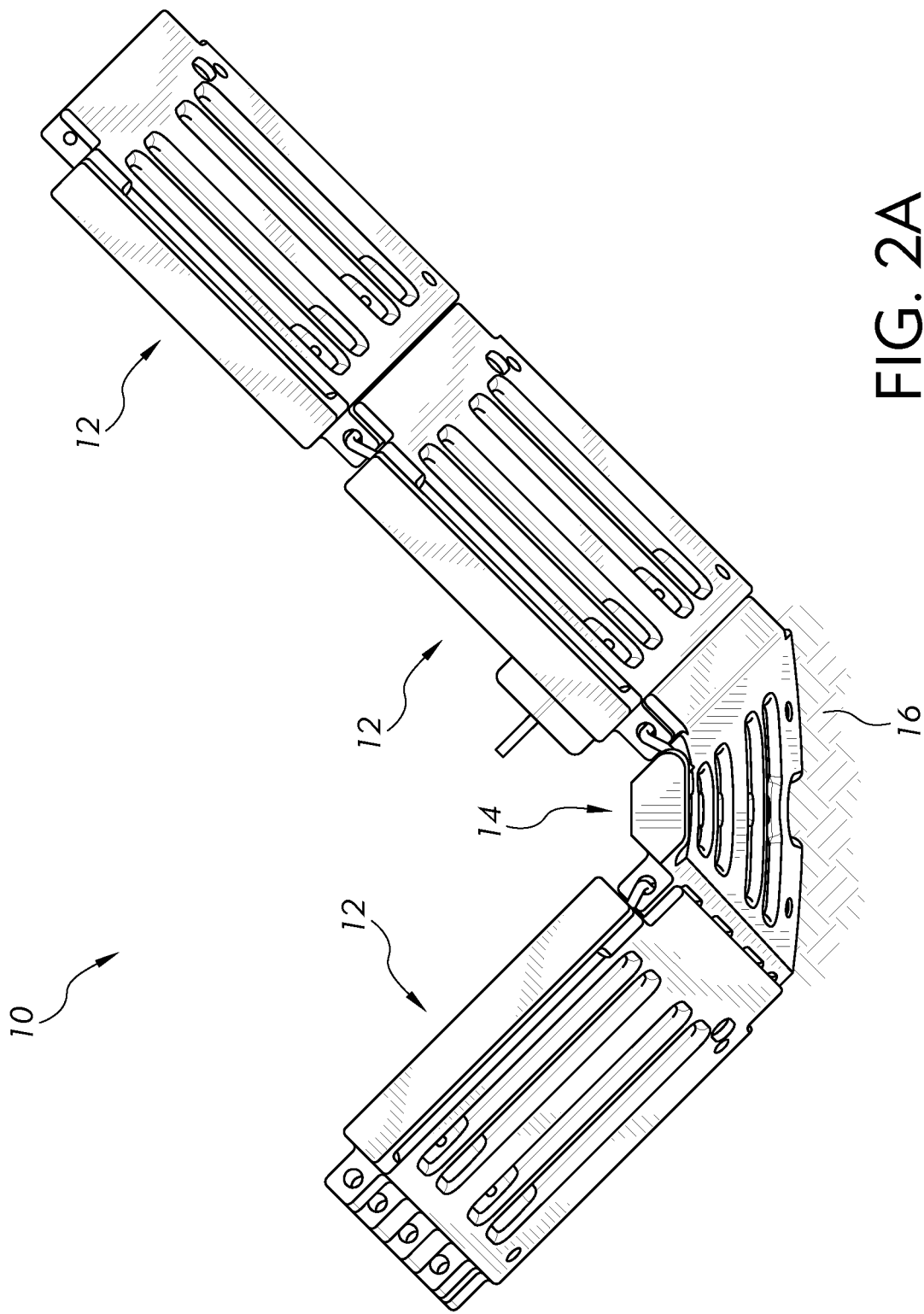
FIG. 2A is a top perspective view of a portion of the barrier system according to FIG. 1A.
Figure 2B:
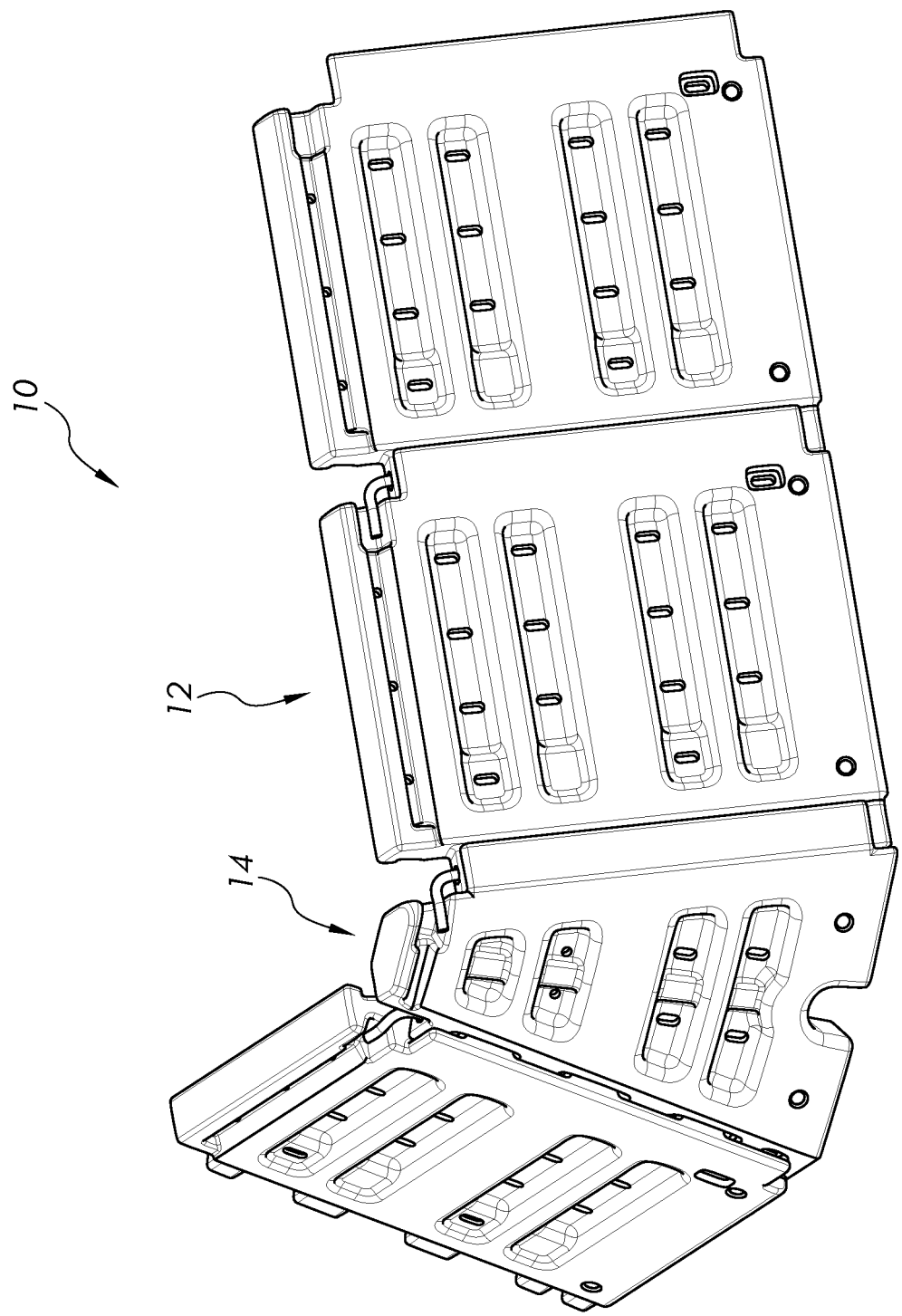
FIG. 2B is a side perspective view of the barrier system of FIG. 2A, taken outside the area to be contained by the barrier system.
Figure 3A:
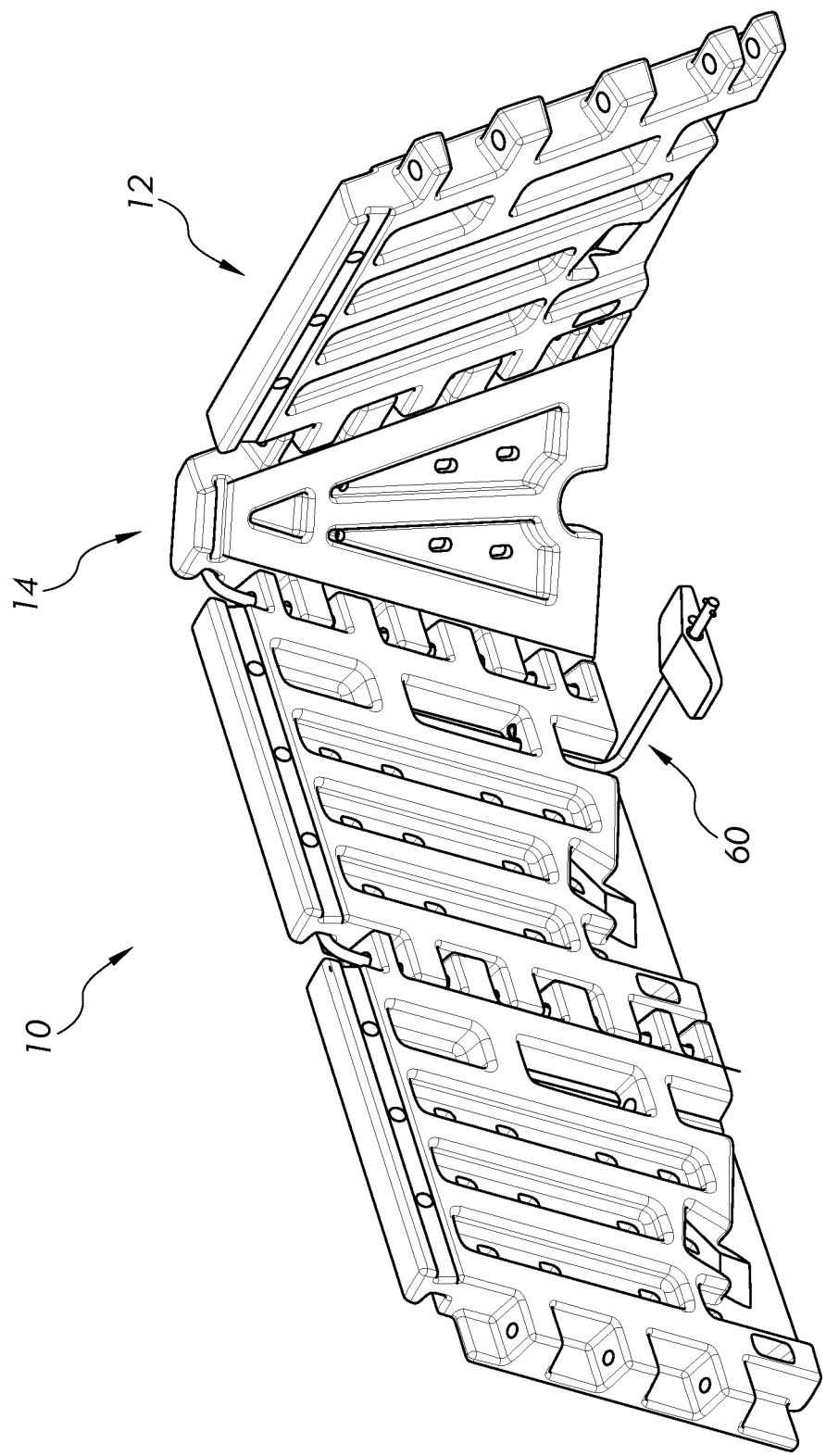
FIG. 3A is a perspective view of the barrier system of FIG. 2A, taken within the area to be contained by the barrier system showing a support assembly in a deployed position.
Figure 3B:
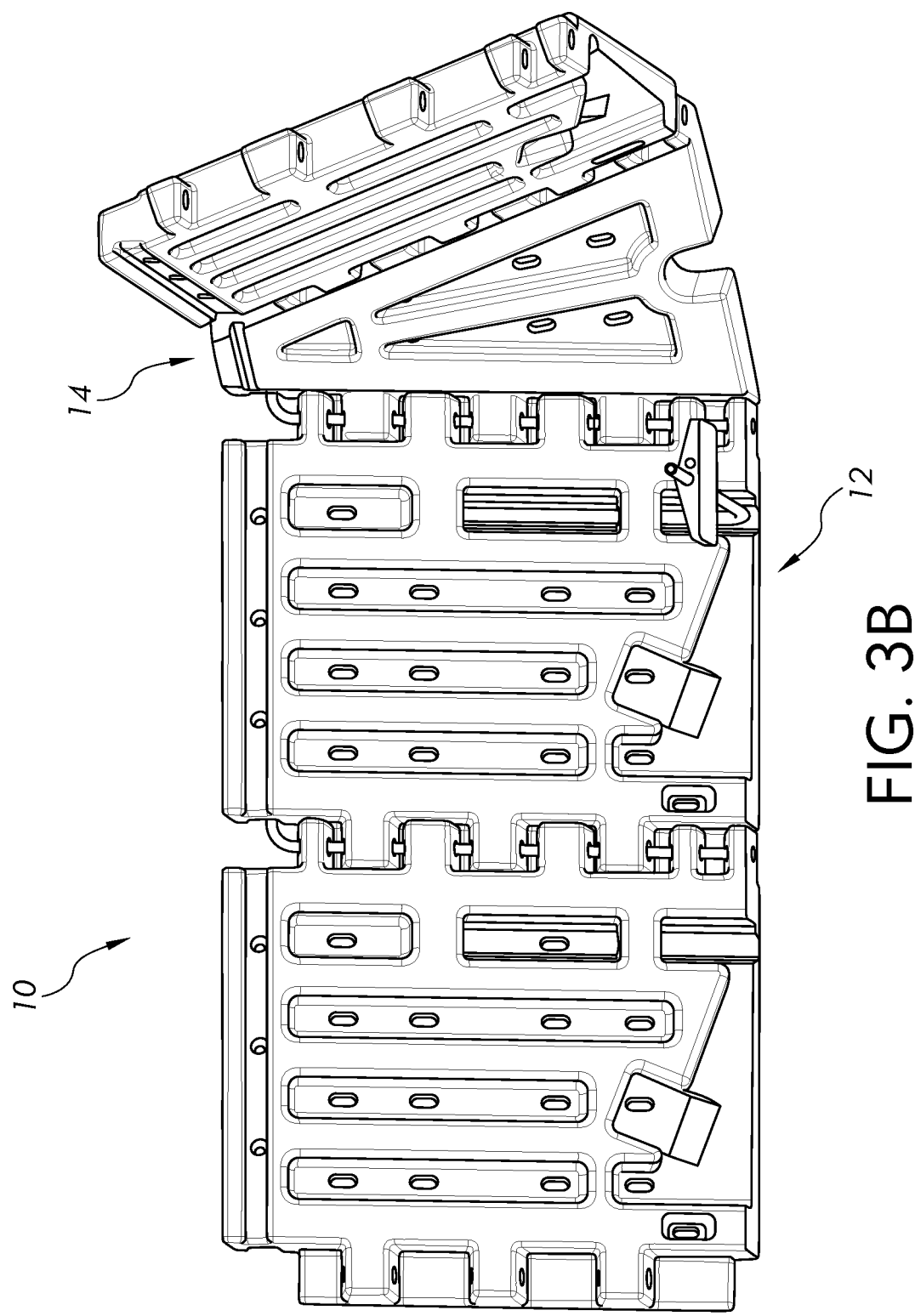
FIG. 3B is another perspective view of the barrier system of FIG. 2A, taken within the area to be contained by the barrier system and showing the support assembly in a deployed position, and further with the rear sides 22 of the side members 12 generally parallel to the page.

As shown in FIG. 1B, the cable assembly can include one or more cables forming a cable gusset 158 disposed at a lower section (near the substratum 16) of any of the side members 12 or corner members 14. The cable gusset 158 can be in the form of a triangle or any other suitable shape. One or two corners of the cable gusset 158 can be coupled to the respective member 12, 14, while an outer corner of the cable gusset 158, spaced from the respective member 12, 14, can be coupled to other cable portions 152, 154, 156.

Figure 7:
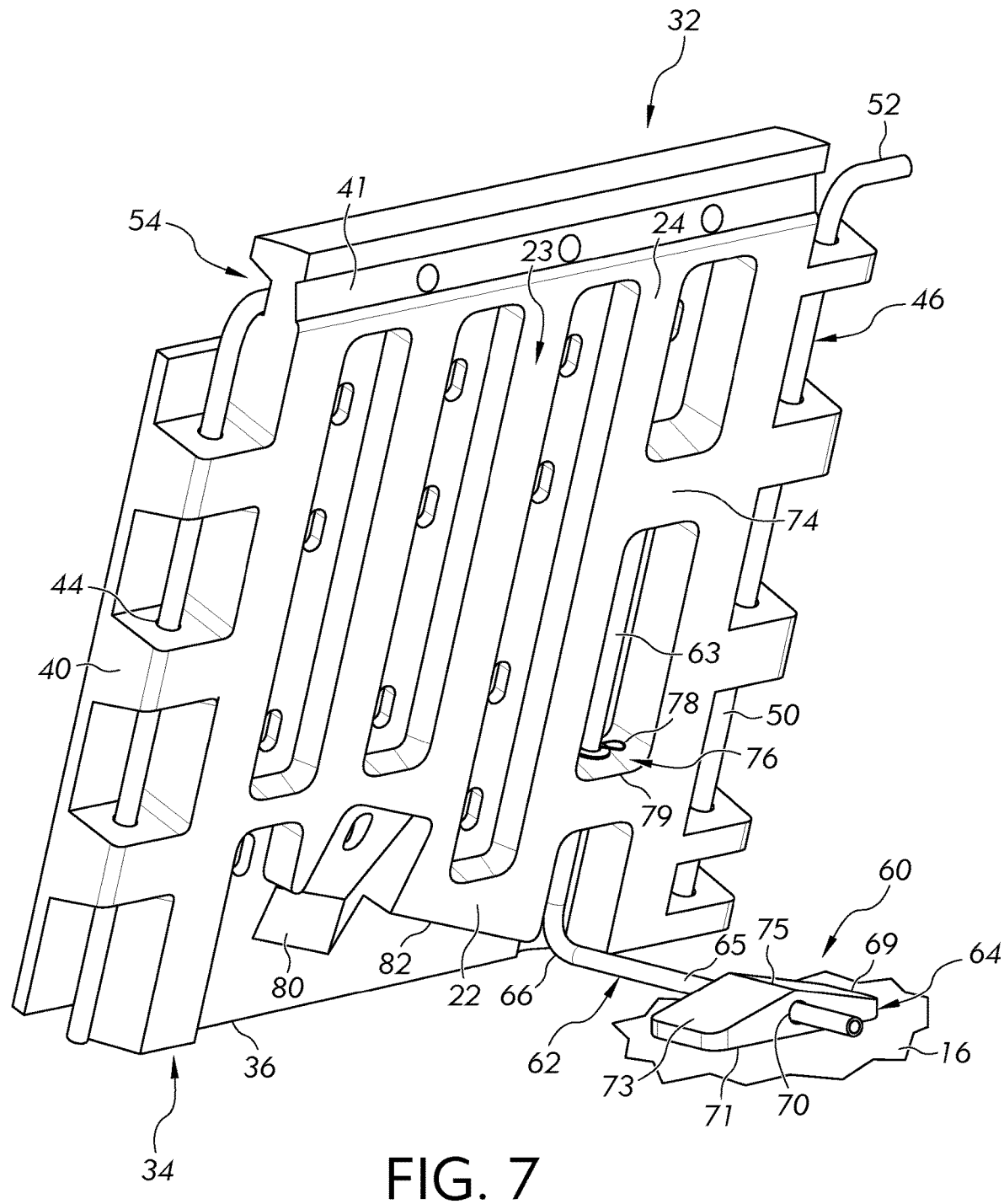
FIG. 7 is a perspective rear view of the side member of FIG. 4, showing the support assembly in a deployed position from a central body of the side member.
Figure 10:
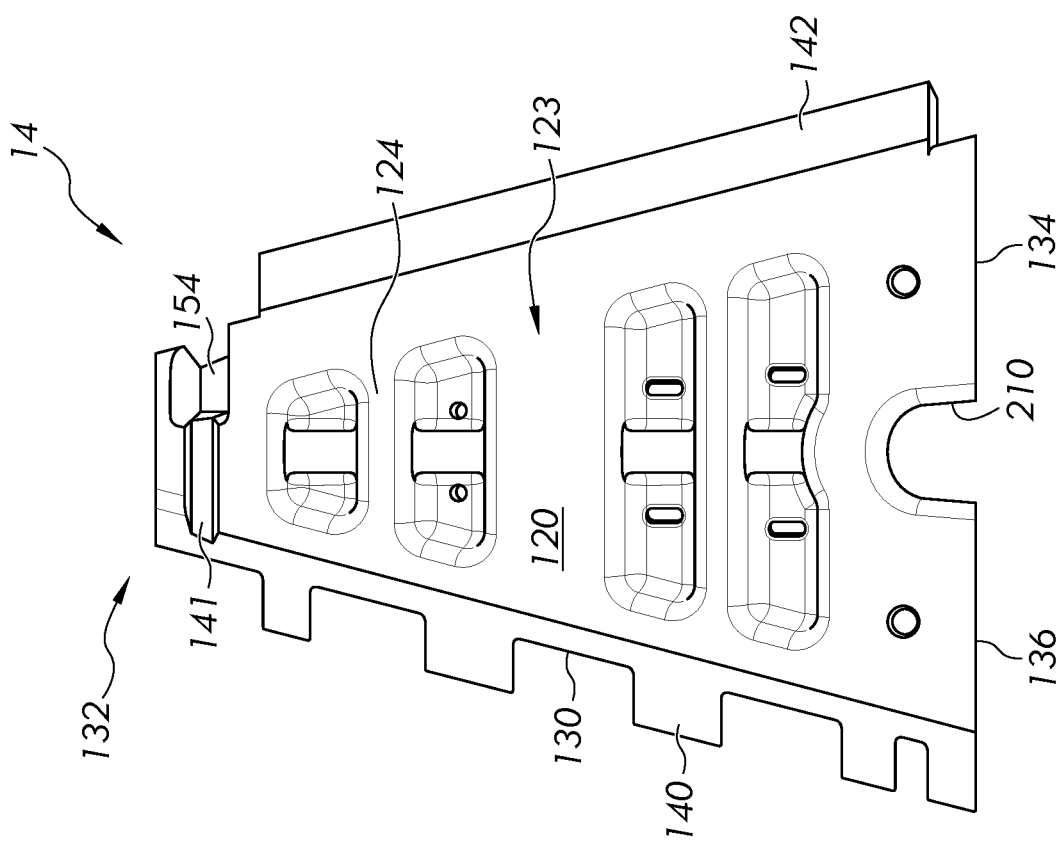
FIG. 10 is a front view of a corner member of the barrier system of FIG. 1A.
Figure 12:
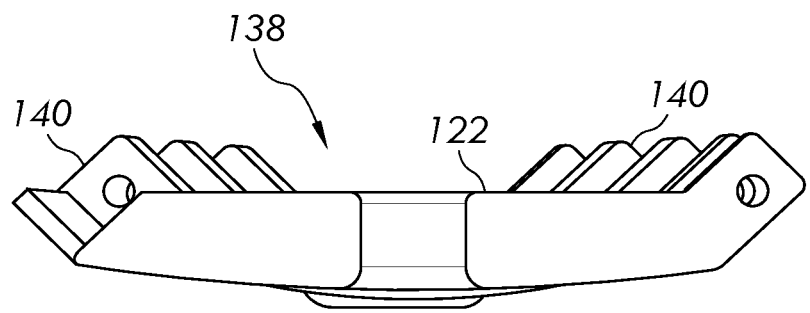
FIG. 12 is a bottom view of the corner member of FIG. 10.
Figure 13:
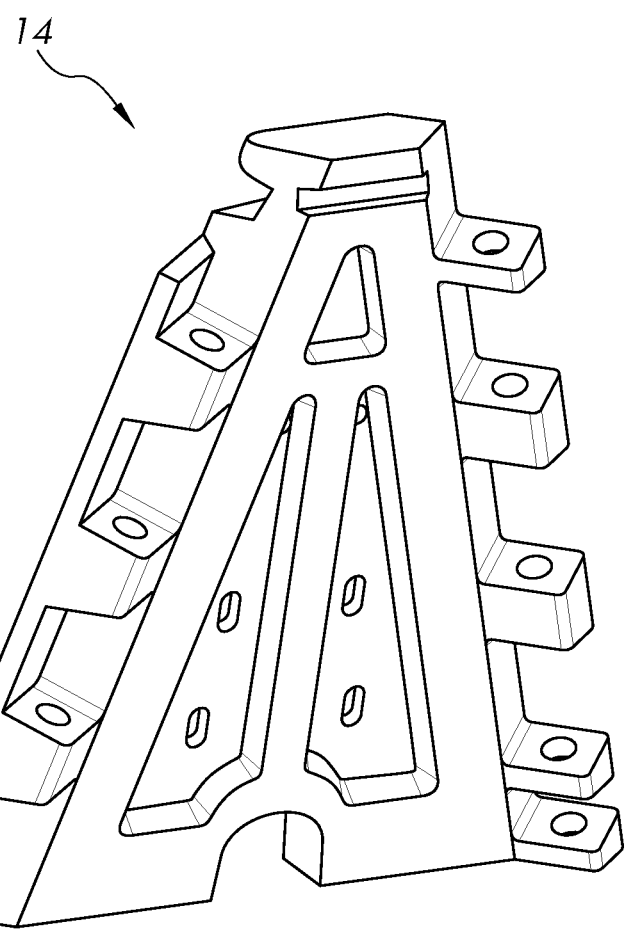
FIG. 13 is a perspective rear view of the corner member of FIG. 10.

Turning briefly to FIGS. 2A-3B, the various cables 152, 154, 156 and 158 can be anchored to the side members 12 and/or to the corner members 14 by looping an end of the respective cable around locking pins 46 (FIG. 7). The loop (not shown) can be disposed along any suitable location along the longitudinal (vertical) length of the locking pin 46, such as between respective teeth 40 (FIG. 4), 140 (FIG. 10) or vertically above any of the teeth 40, 140. To form the loop, a conventional crimp sleeve (not shown) or similar hardware can be crimped over the respective cable. Likewise, any of the various cables 152, 154, 156 and 158 can be coupled to one another in a similar manner to form the cable assembly 150, utilizing conventional crimp sleeves or similar hardware.

Figure 4:
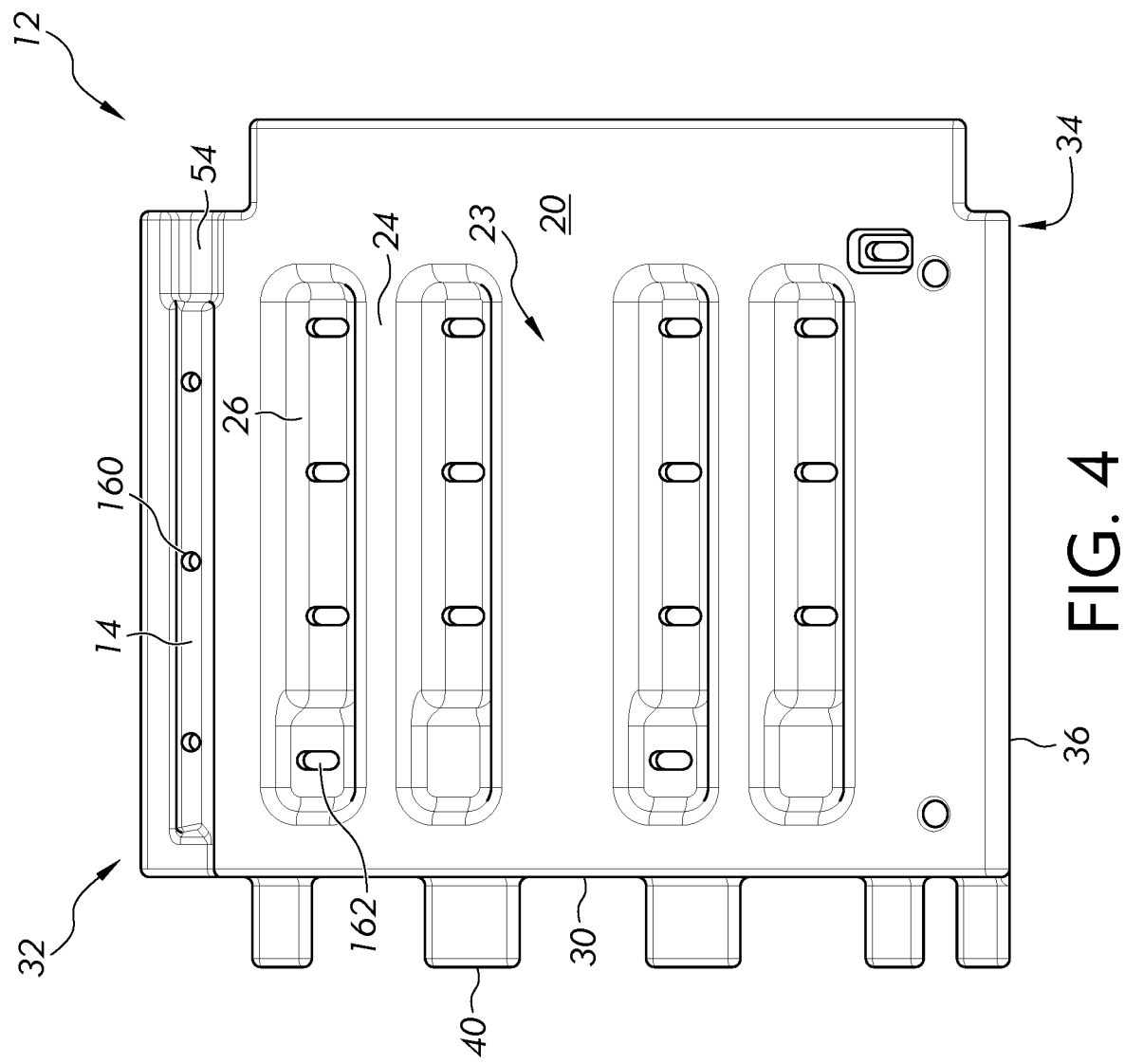
FIG. 4 is a front view of a side member of the barrier system of FIG. 1A.

In other embodiments, the various cables 152, 154, 156 and 158 can be anchored to the side members 12, such as through any suitable orifice, such as orifices 160 or 162 (FIG. 4) at a respective clip channel 41 or recess 26 (FIG. 4).

In some embodiments, the cable assembly 150 can include fewer or more of any of the different cables, and/or the cable assembly can include different cables extending at different lengths and or angles relative to one another. In some embodiments, any of the cables 152, 154, 156, or 158 can be of any suitable thickness. In some embodiments, any cable 152, 154, or 156 can be anchored to a corner member 14.

Turning now to FIGS. 4 to 7, a single side member 12 is illustrated, although the description provided herein is relevant to any of the side members 12. The side member 12 has a generally rectangular or square shape and is formed by a molding process, such as rotational molding, with each of the walls and portions 20, 22, 30, 32, 34 and 36 being integrally formed of a single continuous unit having a hollow interior and opposed walls being spaced apart from one another.

The side member 12 includes a pair of opposed major front and rear side walls 20 and 22. The rear wall 22 is positioned to face the area 11 to be contained while the front wall 20 is positioned to face outwardly from the area 11 to be contained by the barrier system 10. These side walls 20 and 22 define a central body 23 of the side member 12 and have integrally formed ribs 24. The ribs 24 extend in directions different than one another to provide for maximum structurally stability of the side members 12, such as in response to impact from a surging fluid. In the depicted embodiment, a majority of the ribs 24 at one of the major side walls 20, 22 extend generally orthogonal to a majority of the ribs 24 at the other of the major side walls 20, 22 to provide a suitable reinforcing strength. The ribs 24 are spaced apart by recesses 26, thus providing the side member 12 with a corrugated profile when viewed in cross-section.

The side member 12 also includes opposed side end walls 30 that extend between and are integral with the front and rear side walls 20, 22. A top portion 32 and a bottom or base portion 34 are generally opposed and also extend between and are integral with the front and rear side walls 20 and 22. The bottom portion 34 includes a bottom wall or base wall 36 that extends laterally between the side end walls 30 and is configured to seat generally horizontally, such as against the substratum 16, to support the side member 12 in an upright position. The opposed major side walls 20, 22 each extend between the top and bottom portions 32, 34 at acute angles relative to the base wall 36. The acute angles are configured for containing and redirecting a surge flow away from the barrier system 10.

The central body 23 extends laterally between the side end walls 30, and more particularly between outwardly extending mating teeth 40 at the opposed side ends defined by the side end walls 30. The mating teeth 40 are provided for allowing interlocking of adjacent members 12, 14. With respect to the side members 12, the mating teeth 40 at the side ends extend outwardly parallel to one another and parallel to the respective central body 23. The mating teeth are integrally formed with the side end walls 30. In the depicted embodiment, the mating teeth 40 have a generally box-like shape, such as a trapezoidal shape, to allow for easy mating of adjacent members 12, 14 with limited binding of respective mating teeth 40.

A connector shroud wall 42 extends from the front side wall 20 to cover the mating teeth 40 at one side end. In the illustrated embodiment, the shroud wall 42 integrally extends from the right end of the major side wall 20. The shroud wall 42 is hollow and provides additional support for initially engaging teeth 40 of two members and subsequently while the teeth 40 are interlocked, increasing rigidity at the side ends to better maintain the alignment of respective teeth.

Figure 5B:
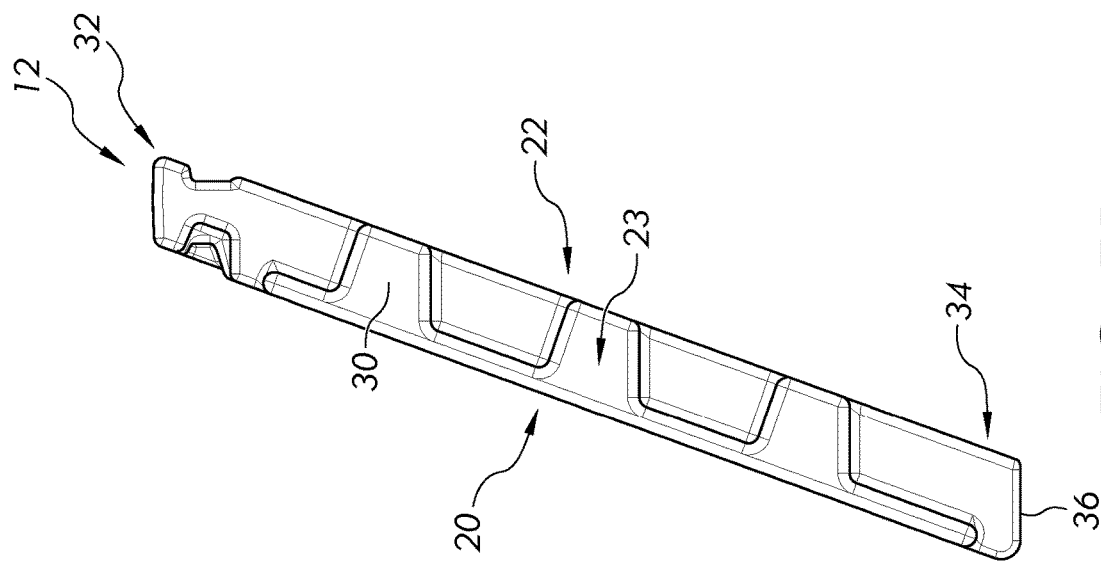
FIG. 5B is a side end view of the side member of FIG. 4.
Figure 5A:
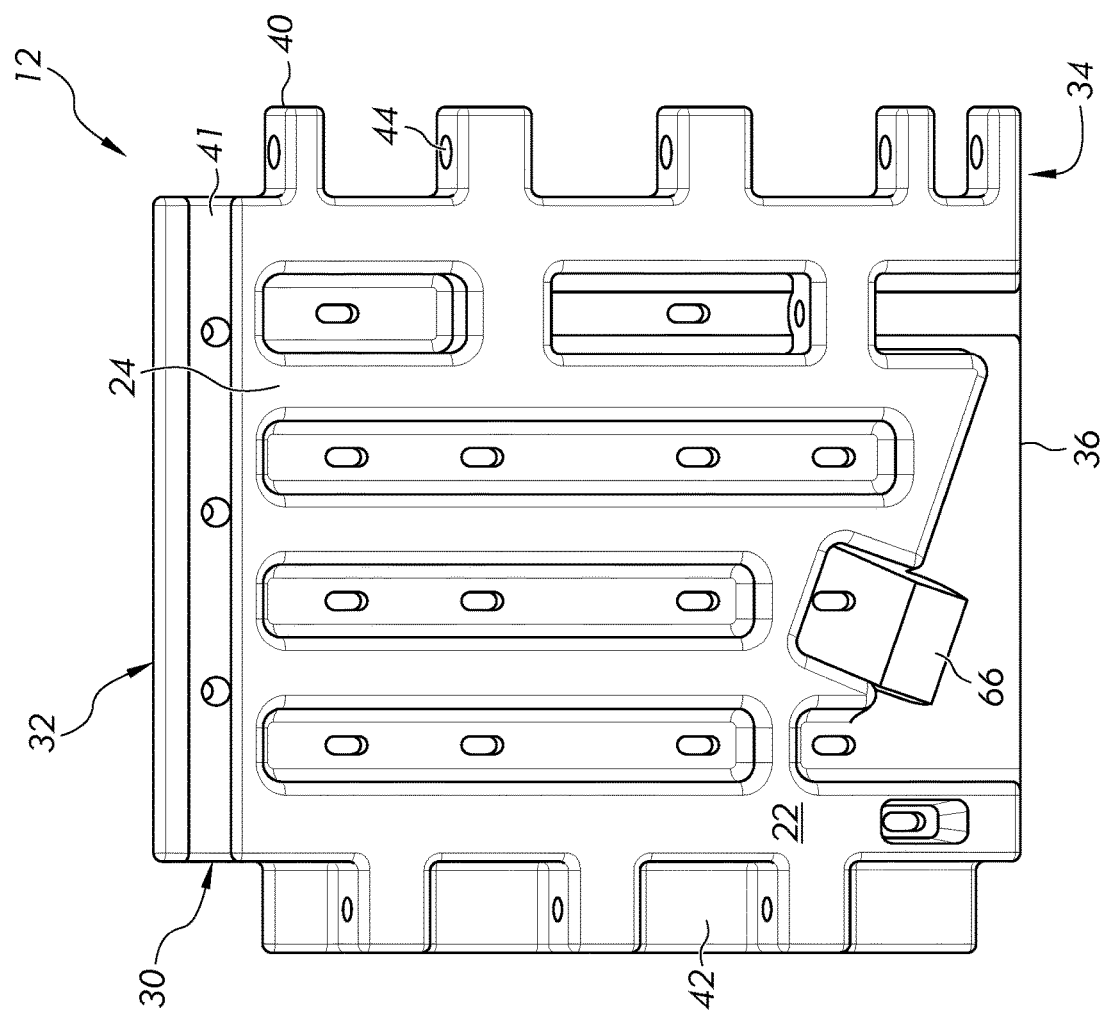
FIG. 5A is a rear view of the side member of FIG. 4.

Referring to FIG. 5B, a side profile of the member 12 is shown, illustrating the ease of stacking and transporting of the member 12 due to its geometry. The member 12 has an overall thickness extending between the opposed major side walls 20, 22 that is generally consistent between the top and bottom portions 32, 34 of the member 12. Additionally, the opposed major side walls 20, 22 extend generally parallel to one another. In this way, a plurality of members 12, and even members 12 and 14 together, can be efficiently stored and transported in a stacked arrangement or configuration, and also more easily moved than prior art members, with reduced concern of members sliding off one another.

Figure 6:
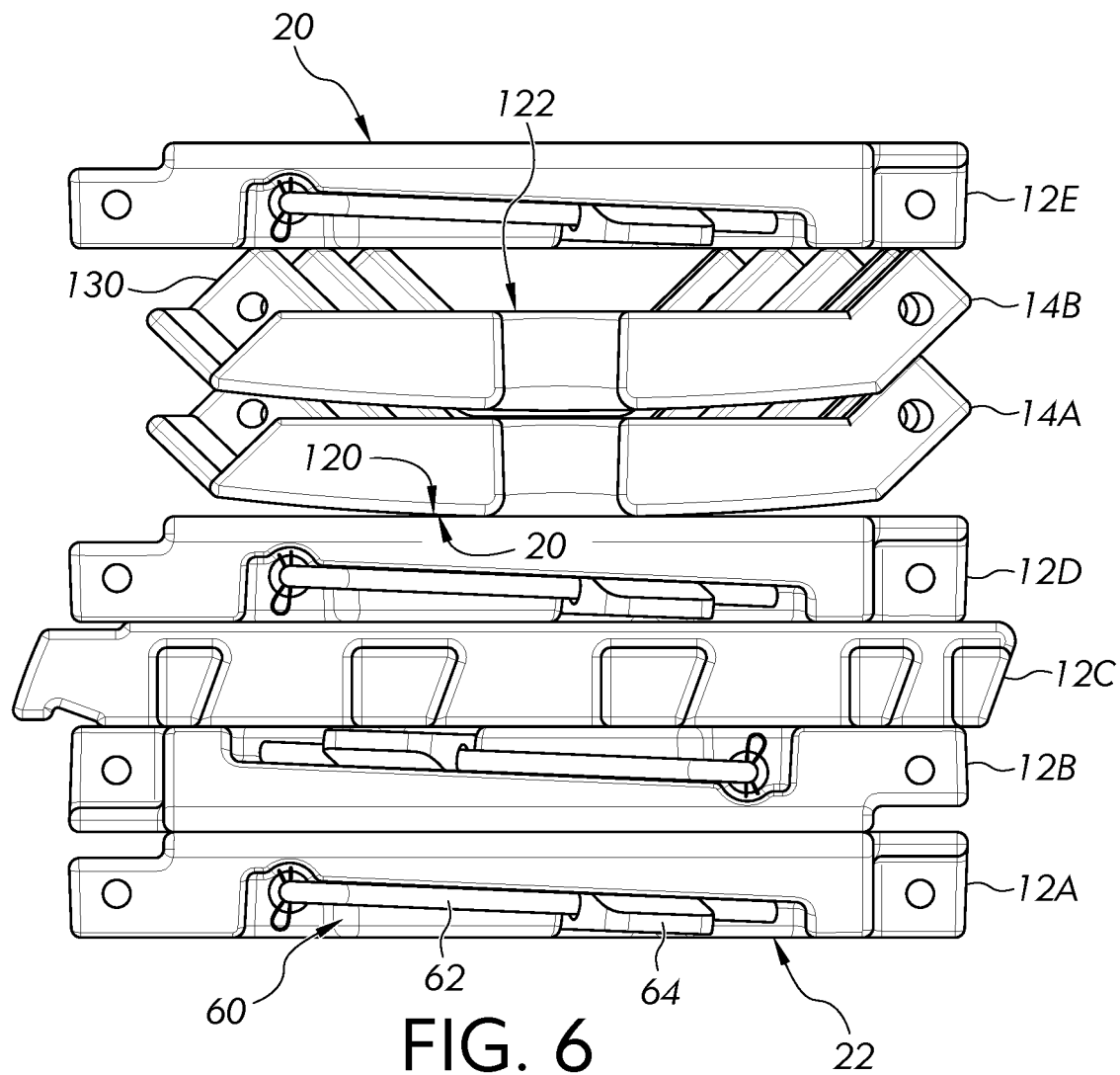
FIG. 6 is perspective view of a stacked arrangement of side and corner members stacked atop the substratum.

Looking to FIG. 6, the central bodies 23 of each of the plurality of members 12 form a plate-like body such that any front and rear walls 20, 22 may be aligned or stacked parallelly against one another in varied respective rotational orientations. Faces of the front wall 20 and the rear wall 22 of each of the plurality of members 12, 14 are contoured to allow an adjacent member to be generally parallel to the substratum when the plurality of members are stacked face-to-face upon one another on the substratum. As shown at FIG. 6, side members 12A-12D are stacked upon one another. Member 12A is face up, member 12B is face down, and member 12C has a rotated orientation relative to members 12A and 12B. That is, if some members 12 are arranged with a front face 20 upward and others with a rear face 22 upward, and regardless of their rotational orientation relative to one another, the members 12 remain easily stackable or alignable face-to-face atop the substratum 16.

Turning now in particular to FIG. 7, a tunnel opening 44 is formed through each tooth 40. The tunnel openings 44 at each side end of the members are aligned in a vertical direction for receipt of a locking pin 46, enabling adjacent members to be interlocked, preventing separation from one another. As depicted, the locking pin 46 is a metallic rod-like or tubular member having a straight portion 50 and an angularly offset handle-lock 52. The straight portion 50 is received in the aligned openings 44 of mating teeth 40 of a pair of adjacent members. The locking pin 46 is then pivotable to dispose said handle-lock 52 within a top portion 32 of an adjacent laterally-extending lock recess 54 via a friction or snap fit, for example, at an adjacent side member 12 or corner member 14.

The illustrated side member 12 also includes at least one, and as depicted, a pair, of laterally extending cross-ribs 74 disposed at the central body 23. The cross-ribs 74 extend between a pair of adjacent ribs 24 formed at the rear side wall 22 of the side member 12. The depicted cross-ribs 74 are disposed more adjacent one of the opposite side walls 30 than the other, such as disposed between central, vertically-extending ribs 24 and mating teeth 40 at one side wall 30. A support opening 76 extends into each of the cross-ribs 74, which openings 76 are positioned and aligned as detailed below. In other embodiments, one or more cross-ribs may be included, having different spacings relative to one another, and/or be otherwise disposed between the opposite side walls 30.

Figure 8:
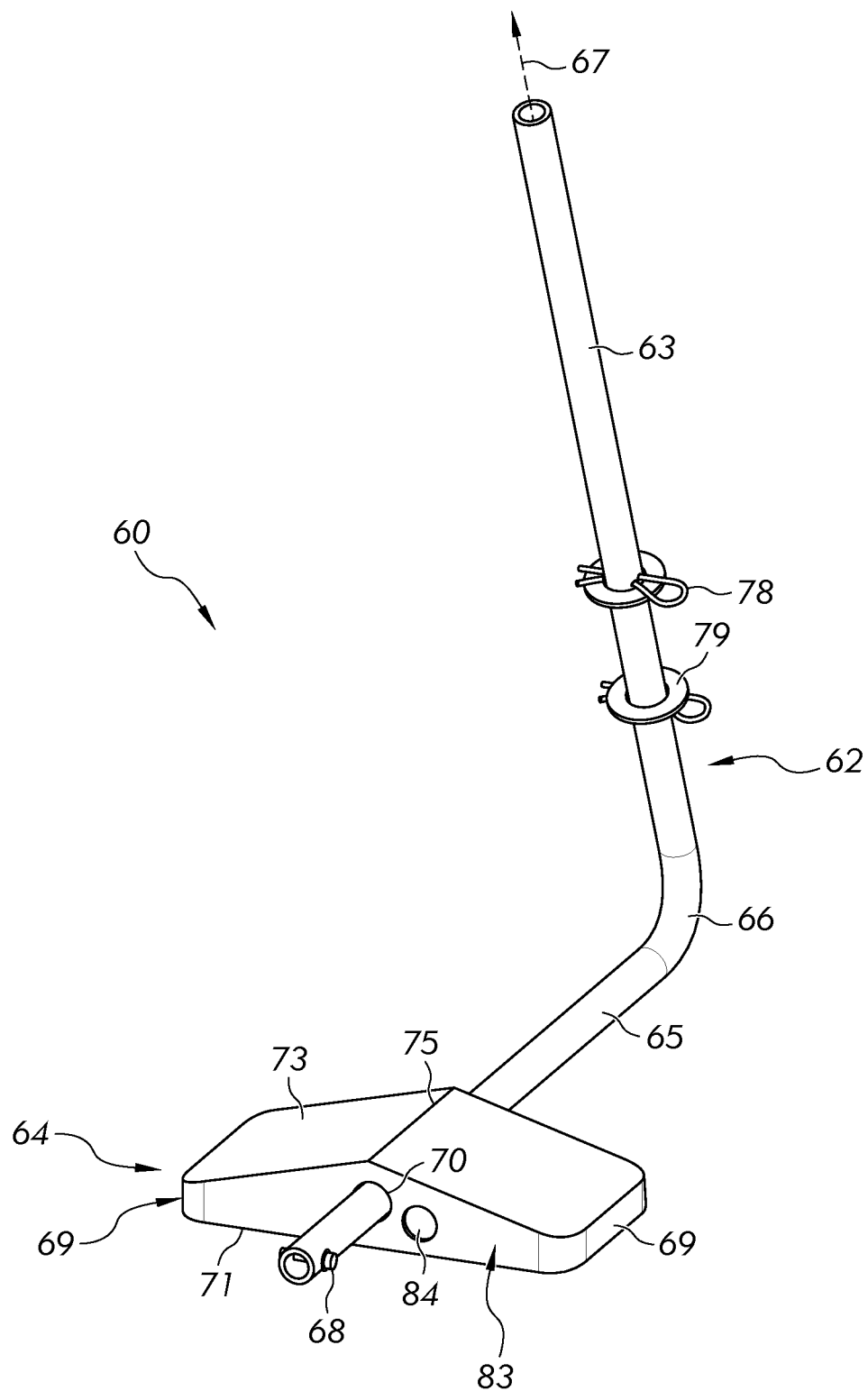
FIG. 8 is a perspective view of the support assembly shown in FIG. 7, apart from the side member.
Figure 11:
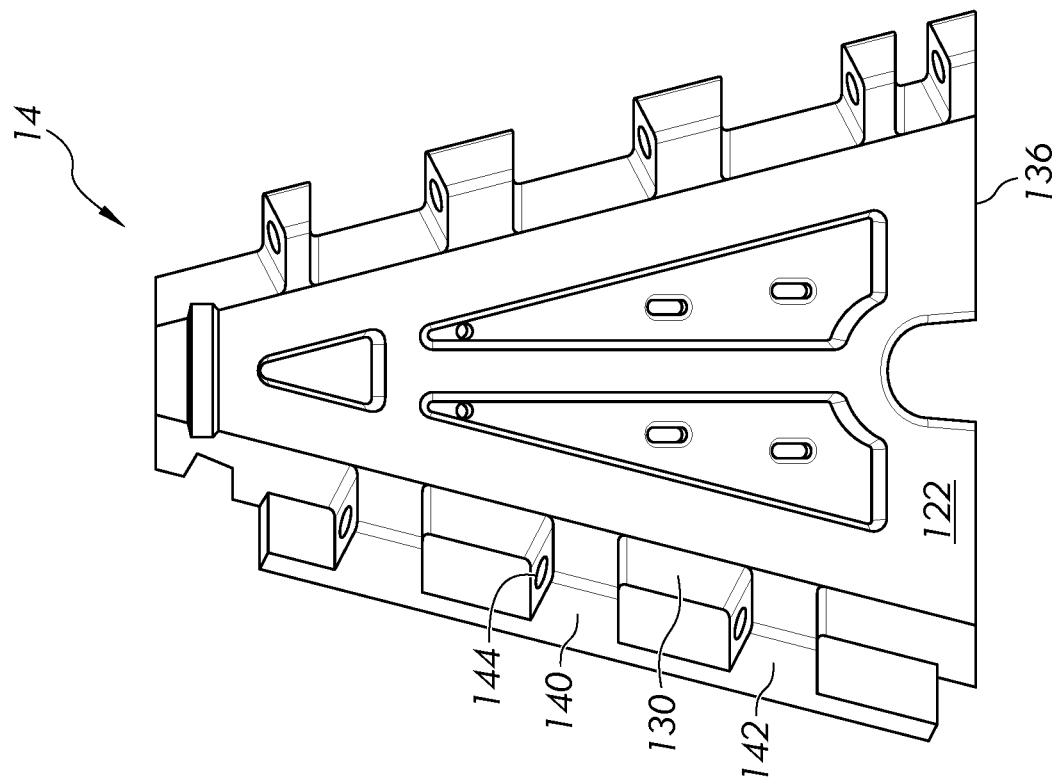
FIG. 11 is a rear view of the corner member of FIG. 10.

Referring next to FIGS. 7 to 9, one more of the side members 12 or corner members 14 may include additional aspects for supporting the barrier system 10 relative to the substratum 16. For example, a kickstand or support assembly 60 can be configured to be coupled to a respective side member 12, such as coupled to the central body 23. Generally, such support assembly 60 is selectively removable relative to the respective side member 12 and also is at least partially moveably coupled to the respective side member 12, allowing for movement of at least one degree of freedom relative to the central body 23. The respective side member 12 is configured to store the support assembly 60 therewith, such as being retained within or on the side member 12, although all side members 12 need not each include a support assembly 60.

The support assembly 60, in general, includes a tube or rod support 62, such as a hollow tube, pivotably coupled to the rear side wall 22. The support 62 is generally angled, has an upper section 63, that preferably is generally straight, and a bottom section 65 extending at an angle from the upper section 63, which also is preferably generally straight. The bottom section 65 and the upper section 63 each extend linearly from an intermediate curved section 66 disposed between the sections 63 and 65. The tube or rod support 62 is pivotable relative to the central body 23 to allow the bottom section 65 to be disposed along the substratum 16, such as being pivotable about a longitudinal axis 67 (FIG. 8) of the upper section 63.

In some embodiments, such as the one depicted in FIGS. 7 to 9, the rod support 62 may support a foot 64 that is coupled to the bottom support 65 and engageable with the substratum 16. The foot 64 is pivotable about the bottom section 65 to best align with the substratum 16 to support the side member 12 in an upright configuration. In some embodiments, the foot 64 may be linearly slideable along the support section 65 so a user may selectively position the foot 64 along the support section 65. It is contemplated that a fixing element 68, such as the illustrated set screw may be used to secure the foot 64 to the support section 65 at a predetermined location. In other embodiments, an elastic ring or other fastener, e.g., a cotter pin or a collar with a set screw, may be received about the bottom section 65 for securing the foot 64 to the bottom section 65. It also contemplated that the fixing element 68 may fix the pivoting position of the foot on the support section 65.

The foot 64 generally has a block shape, such as a triangular block shape as in the embodiment shown. Particularly, the foot 64 has a width extending between opposite sides 69, which width is greater than a height or thickness (each generally orthogonal to one another and to the width) of the foot 64. The foot 64 has a substantially flat base 71 and a tapered upper surface 73. Specifically, the upper surface 73 is tapered downwardly in opposite directions from a central apex line 75 of the upper surface 73, disposed medially between the opposite sides 69. The opposite tapers extend from the apex line 75 to the opposite sides 69. The foot 64 is illustrated as having one particular shape, but it is contemplated that the foot 64 may have other shapes, including but not limited to, block, rectangular, circular, etc. It also is contemplated that the base 71 may include treads or other features for better gripping against the substratum 16.

As shown, in the illustrated embodiment of FIGS. 7 and 9, the side member 12 and the support assembly 60 are configured to be coupled to one another. The upper section 63 is received into and extends through the one or more support openings 76 in the central body 23. Particularly, the support openings 76 extend into each of the cross-ribs 74 for receiving the section 63 of the support 62 therethrough. That is, the support openings 76 each are axially aligned with one another. It is contemplated that the support opening 76 of the upper rib 74 may not extend fully through the rib 74, while the support opening 76 of the lower rib 74 may extend fully therethrough.

One or more fasteners 78, such as the illustrated cotter pins, are received into the upper section 63 once the upper section 63 is received through the cross-ribs 74. A circular washer 79 is disposed about the upper section 63 at the location of each fastener 78, particularly disposed between the respective fastener 78 and an upper or lower face of the respective cross-rib 74. This fastening assists in restricting linear translation of the upper section 63 relative to the cross-ribs 74, while not hindering at least some pivoting of the support 62 relative to the central body 23. In this way, the support 62 is prevented from being unwantedly linearly separated from the central body 23, but still may be pivotable to adjust the foot section 65 relative to a substratum 16.

The depicted support assembly 60 can be selectively positioned in a deployed position (FIG. 7) and a stowed position (FIG. 9). In the deployed position, the support assembly 60 is pivoted such that the foot 64 is positioned away from the major side wall 22 of the side member 12. The support assembly 60 may be configured so that the foot 64 engages the substratum 16. In the embodiment shown, the flat base 71 may be positioned to be generally parallel to the sub stratum 16.

The major rear side wall 22 may be contoured to include features for receiving and retaining the support assembly 60 in the stowed position. For example, the support assembly 60 may be retained to the rear side wall 22 using fixing methods, including but not limited to, friction fit, snap fit, fasteners, etc. Thus, the depicted support assembly 60 is configured to mate with the rear side wall 22 of the respective side member 12.

The rear side wall 22 may include a foot recess 80 for receiving the foot 64 and an angled ridge 82 for retaining the bottom section 65 of the support 62. The angled ridge 82 is acutely offset from the bottom wall 36. One or more of the foot 64, foot recess 80 and ridge 82 may be configured to include one or more snap features for aiding in retaining the support assembly 60 in the stowed configuration. For example, as shown best at FIG. 8, a front face 83 of the foot 64 includes a snap recess 84 for receiving a protrusion snap feature at the rear side wall 22 of the side member 12.

When the support assembly 60 is in the stowed (mated) position, the depicted support assembly 60 may be configured not to extend outwardly beyond the rear side wall 22 to thereby limit interference during stacking and transport of one or more side members 12. See, for example, FIG. 6, showing members 12A and 12B with support assemblies 60 in deployed configurations and stacked upon one another, face-to-face. That is, the foot recess 80 and ridge 82 each may be recessed from the outermost surface of the rear side wall 22 inwardly into the central body 23, to thereby respectively receive the foot 64 and the bottom section 65/curved section 66.

Because of the angled-shape of the support 62 and the acute angle of the rear side wall 22, when the support assembly 60 is pivoted from the stowed position to the deployed position, the bottom section 65 of the support 62 and the foot 64 may pivot upward and into the rear side wall 22. This pivoting of the bottom portion 65 about the top portion 63, and the pivoting of the foot 64 relative to the bottom section 65, also allows the foot 64 to pivot with the bottom section 65 and be received into the foot recess 80.

In some embodiments, support assemblies 60 and cable gussets 158 can both be used at the same or at different members 12 and 14 to aid in supporting the system 10 in an upright position. In some embodiments, any support assembly 60 can be utilized without a foot 64.

Next turning to FIGS. 10 to 13, a single corner member 14 is illustrated, although the description provided herein is relevant to any of the corner members 14. The corner member 14 is substantially similar to the side member 12, and consequently the same reference numerals but indexed by 100 are used to denote structures of the corner member 14 corresponding to similar structures of the side member 12. In addition, the foregoing description of the side member 12 is equally applicable to the corner member 14 except as noted below.

The corner member 14 has a generally triangular shape and, like the side member 12, is formed by a molding process, such as rotational molding. Each of the walls and portions 120, 122, 130, 132, 134 and 136 are integrally formed of a single continuous unit having a hollow interior and opposed walls are spaced apart from one another. The corner member 14 includes ribs 124 integrally formed with a central body 123, and the central body 123 includes front and rear walls 120, 122 extending at acute angles from a generally horizontal base wall 136.

The substantially triangular shape of the central body 123 extends laterally between outwardly extending mating teeth 140 that extend from side end walls 130 for allowing interlocking with adjacent members, such as side members 12. The teeth 140 at the opposite side end walls 130 are angled outwardly away from one another, though the mating teeth 140 at each respective side end extend outwardly parallel to one another. These teeth 140 also extend at an acute angle relative to the respective central body 123, being generally plate-like; that is, relative to a plane of at least one of the respective opposed major side walls 120, 122.

More particularly, the teeth extend rearwardly having an extension component extending in a general direction rearward from the rear side wall 122. In this way, corner members 14 are alignable with one another with a front opposed major side wall 120 of one corner member 14 being received adjacent a rear opposed major side wall 122 of another corner member 14. Put another way, the corner members 14 are alignable with one another with a front opposed major side wall 120 of one corner member 14 being received into a U-shaped channel 138 (FIG. 11) defined by rear wall 122 and side end wall-extending teeth 140 of another corner member 14. Additionally, a corner member 14 and a side member 12 of a plurality of members can be alignable against one another with the front opposed wall 120 of the corner member 14 being disposed adjacent either of the front or rear wall 20, 22 of the side member 12, and with central bodies 23, 123 of each of the side and corner members 12, 14 extending laterally and being generally laterally parallel one another.

Similar to the side member 12, the corner member 14 includes a shroud wall 142 and the teeth 140 include tunnel openings 144 for receiving a locking pin 46. The rear wall 122 also includes a laterally-extending lock recess 154. While not particularly shown, in other embodiments, a rear wall 122 of a corner member 14 could be modified to support and/or to retain a support assembly 60.

Also, the central body 123 includes a lower opening 210, the purpose of which is detailed below. The lower opening 210 extends fully through the central body 123 between the front and rear side walls 120 and 122, and extends vertically into the central body from the base wall 136. The depicted opening 210 is generally arch-shaped. In other embodiments, the opening 210 may be through another portion of the central body 123 or have another suitable shape.

Further, again looking to FIG. 6, the central bodies 123 of each of the plurality of corner members 14 form a plate-like body such that the corner members 14 may be aligned or stacked parallelly against one another upon the substratum 16. As shown at FIG. 6, faces of a front wall 120 and a rear wall 122 of pair of corner members 14 can be arranged adjacent one another in a stack of corner members 14, such that the corner members 14 are in a same and nested orientation relative to one another and relative to the substratum 16. See, for example corner members 14A and 14B at FIG. 6. Likewise, the front side 120 of a corner member 14 can be arranged against either of a front or rear side 20, 22 or a side member 12. See, FIG. 6, where a front side 120 of corner member 14A is arranged adjacent to a front side 20 of the side member 12D. Additionally, either of a front or rear side 20, 22 of a side member can be arranged atop the teeth 130 of a corner member 14, with the rear side 122 facing upward. See, for example, side member 12E at FIG. 6, which is arranged atop corner member 14B.

Figure 14:
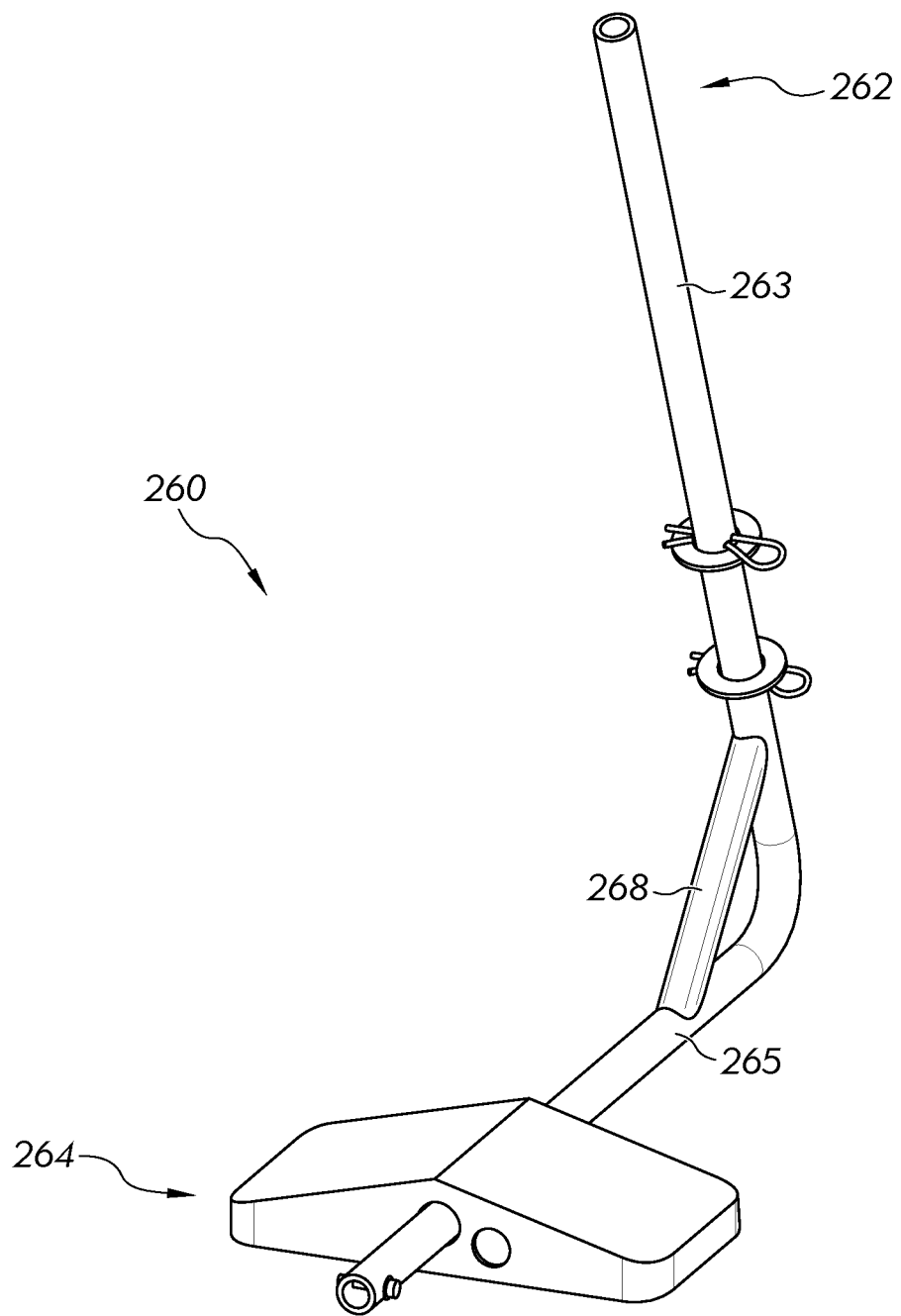
FIG. 14 is a perspective view of a support assembly according to another embodiment, the support member of the support assembly including an additional brace gusset 268.

Referring next to FIG. 14, an alternative support assembly 260 is illustrated, similar to the support assembly 60 illustrated at FIG. 8. Similar to the support assembly 60, the support assembly 260 is selectively removeable relative to the respective side member 312 between a stowed position and a deployed position. The support assembly 260 includes a generally angled tube or rod support 262, such as a hollow tube, pivotably coupled to the rear side wall 222 of the side member 312. A brace gusset 268 is coupled, such as welded, between the top portion 263 and the bottom portion 265, at a transverse angle to each of these top and bottom portions 263, 265. The brace gusset 268 can be a tube, rod, or combination thereof. A foot 264 is coupled to a bottom portion 265 of the rod support 262. In other embodiments, the brace gusset 268 can have a plate- or bar-shape.

Figure 15:
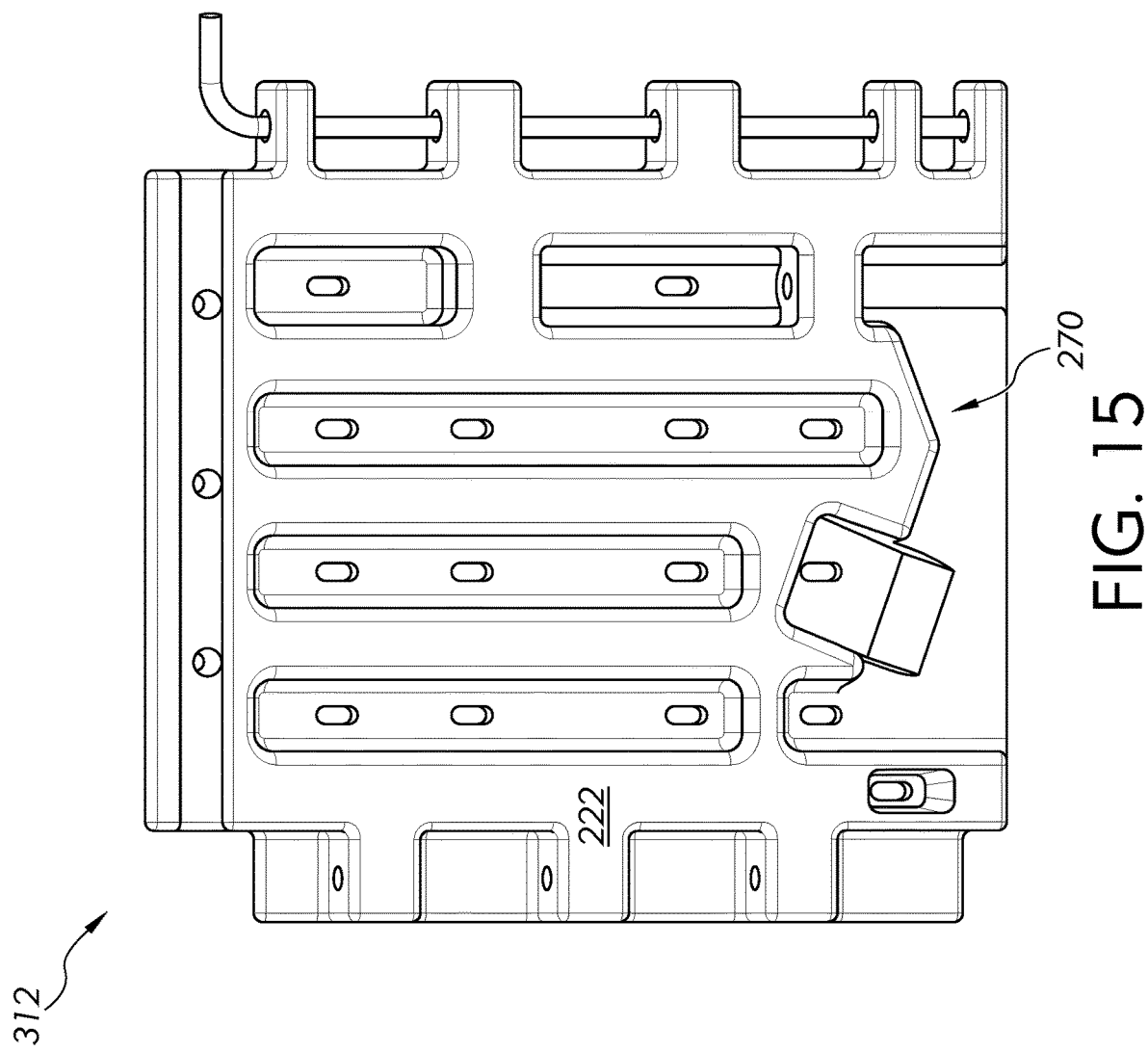
FIG. 15 is a perspective view of a side member according to another embodiment for receiving the support assembly of FIG. 14.

As compared to the side member 12, the side member 312 (FIG. 15) is substantially similar, but includes an additional cutout 270 at the rear side wall 222 for allowing the brace gusset 268 to properly seat against the rear side wall 222 of the side member 312.

In some embodiments, any of support assemblies 60 or 260 and cable gussets 158 can be used at the same or at different members 12, 312 or 14 to aid in supporting the system 10 in an upright position. In some embodiments, any support assembly 260 can be utilized without a foot 264.

Figure 16:
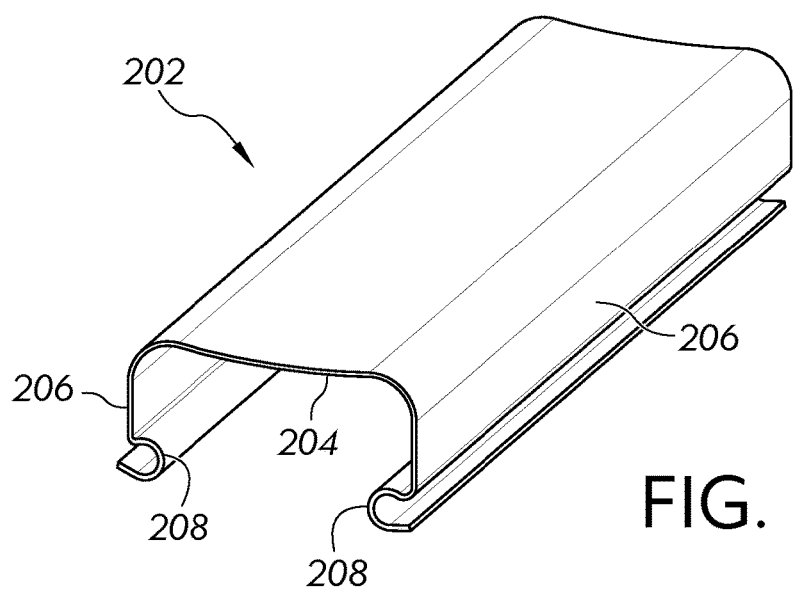
FIG. 16 is a perspective view of a resilient clip for securing a liner to the barrier system of FIG. 1A.
Figure 17:
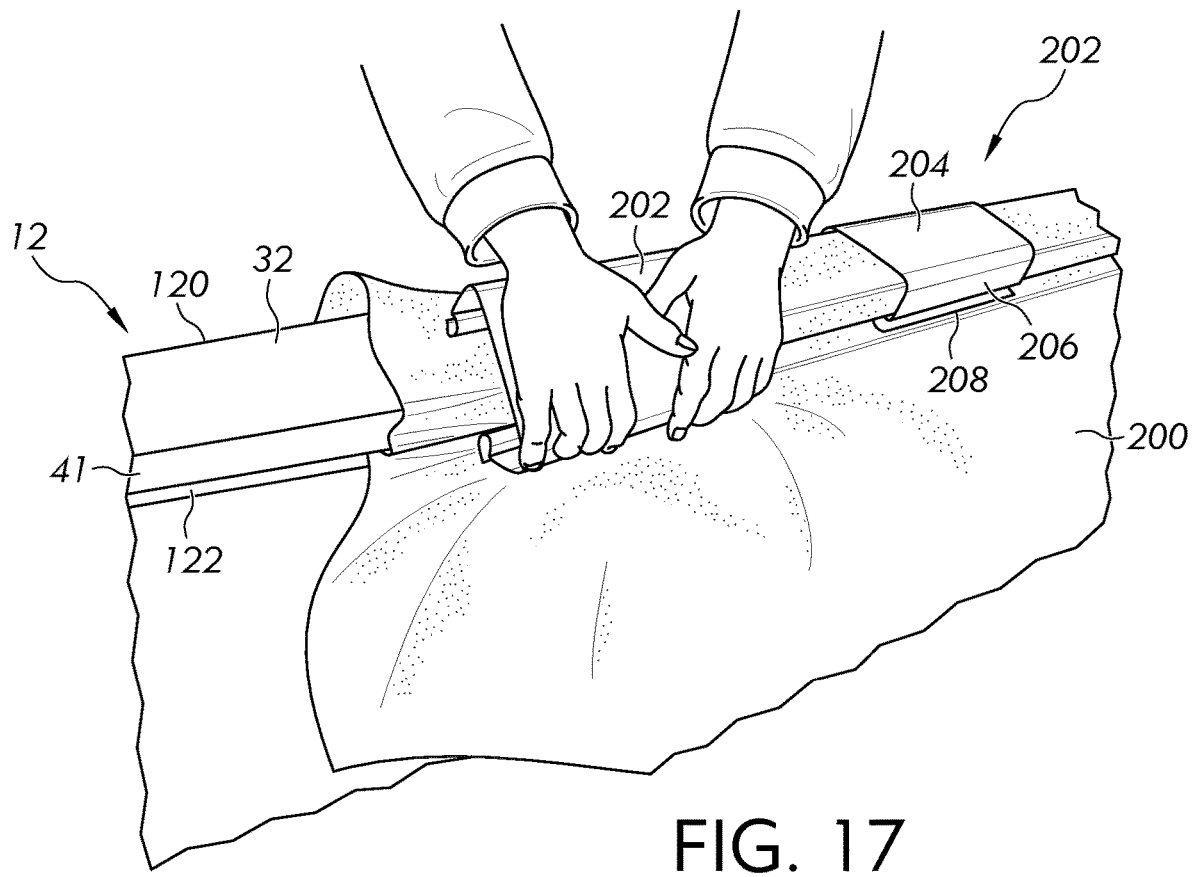
FIG. 17 is a fragmentary perspective view showing the liner secured to a member forming the barrier system of FIG. 1A using the clip of FIG. 16.

Turning now to FIGS. 16 to 18, in some instances, a partial or completely enclosed barrier system 10 of a suitable shape may include a liquid impermeable barrier film or liner 200 that can be disposed between a primary container (not shown) and the members 12 and 14. The liner 200 can be connected to one or more members such as by a web of line, rope, etc. Alternatively, one or more resilient clips 202 as shown in FIGS. 16 and 17 may be used.

The liner 200 preferably can be a flexible flat sheet that can be conformed to the interior shape of the barrier system 10 including the surfaces of the side and corner members 12, 14 as well as the contour of the substratum 16. The liner 200 may be formed of a suitable plastic material such as polyamide, polyester or polyurethane with or without reinforcement. The liner may be transparent or opaque and/or comprise a fabric/plastic laminate.

Referring to FIG. 16, a resilient clip 202 is illustrated for mounting an edge of the liner 200 to a clip channel 41, 141 at a front or rear side wall 20, 22, 120, 122 of a respective top portion 32, 132 of a member 12, 14, 312 as shown in FIG. 17. The clip 202 has a channel or U-shape including a central flat bight 204 connecting opposed channel legs 206. Each of the channel legs 206 terminates at a reverse bend 208. The clip 202 is symmetrical about its longitudinal axis and it may be mounted with either leg 206 adjacent either of the front or rear walls 20, 22, 120, 122 and either reverse bend 208 received into a respective clip channel 41, 141. The clip 202 is formed of glass fiber reinforced resin such as polyethylene, polypropylene, polyvinyl chloride, polystyrene and polyester as well as recycled plastics and/or inert fillers. A limited range of elastic deformability or flexibility is provided for resiliently engaging the top portion 32, 132. Any suitable number of clips 202 may be used to securely mount the liner 200 to the barrier system walls.

Turning to FIG. 18, one or more corner members 14 may include the lower opening 210, which may be a tunnel drain opening 210 for allowing a tube or duct to pass through the barrier system 10. A duct 212 is depicted as extending through the tunnel drain opening 210 and connected to the liner 200, such as by a selectively openable drain valve 214. In this way, fluid within the barrier system 10, such as by the liner 200, can be drained from the barrier system 10 without disconnecting elements 12, 14 of the system 10 from one another.

In summary, a modular dike or barrier system 10 includes interconnectable side and corner members 12, 14, 312 having front and rear walls 20, 22, 120, 122, 222 with integrally formed support ribs 24. Upper, base and side end walls 30, 36, 130, 136 connect and are integral with the front and rear walls 20, 22, 120, 122, 222. Each of the front and rear walls 20, 22, 120, 122, 222 extends at an acute angle relative to the base wall 36, 136 that is configured to rest against a substratum 16. The inward acute angle allows for containing and redirecting a surge flow inwardly within an area 11 contained by the barrier system 10 in a direction away from the members 12, 14, 312. The members 12, 14, 312 are generally plate-like and are configured to allow for horizontal stacking on the substratum 16. Members 12, 14, 312 can include a selectively collapsible support assembly 60, 260 configured to be retained at central bodies 23 of the respective members 12, 14, 312 and to limit interference during stacking and transport of the members 12, 14, 312.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents.

What is claimed is:

1. A fluid surge resistant modular barrier system for retaining a fluid, the modular barrier system comprising:
    a plurality of members configured to be connected to one another to form a barrier,
    the plurality of members each including a front wall and an opposed rear wall, each of the front wall and the rear wall having integrally formed support ribs, the plurality of members each also including an upper wall, a base wall and opposing side end walls extending between the front wall and the rear wall, the base wall configured to rest against a substratum, and
    faces of the front wall and the rear wall of each of the plurality of members being contoured to allow an adjacent member to be generally parallel to the substratum when the plurality of members are stacked upon one another on the substratum.

2. The modular barrier system of claim 1, wherein the plurality of members are horizontally stackable atop one another regardless of their rotational orientation relative to one another.

3. The modular barrier system of claim 1, wherein the base wall of each of the plurality of members is at an acute angle relative to the front wall and the rear wall such that each of the plurality of members is inwardly angled toward an area to be contained by the modular barrier system.

4. The modular barrier system of claim 3, wherein the system is generally rectangular in shape with four corners, each corner formed by a corner member.

5. The modular barrier system of claim 1, wherein at least one of the plurality of members includes a support assembly for maintaining the member at an acute angle relative to the sub stratum.

6. The modular barrier system of claim 5, wherein the support assembly includes an angled support member, and wherein the support assembly is moveable between a stowed position and a deployed position.

7. The modular barrier system of claim 6, further including a substratum-contacting foot member coupled to the angled support member.

8. The modular barrier system of claim 7, wherein the front wall or the rear wall of the at least one of the plurality of members is contoured to receive and retain the foot member when the support assembly is in the stowed position.

9. The modular barrier system of claim 6, wherein the front wall or the rear wall of the at least one of the plurality of members is configured to retain the support assembly in the stowed position when the plurality of members are stacked on the substratum.

10. A fluid surge resistant modular barrier system for retaining a fluid, the modular barrier system comprising:
    a plurality of side members each having a central body extending laterally between outwardly extending mating teeth at opposed side ends of the central body, wherein the central body includes a front wall and a rear wall that extend at a first acute angle from a base wall, the base wall configured to engage a substratum to support the side member at the first acute angle relative to the substratum; and
    a plurality of corner members each having a triangular shaped body with outwardly extending mating teeth at opposed side ends of the body, wherein the body has a front wall and a rear wall extending at a second acute angle from a base wall, the base wall configured to engage a substratum to support the body at the second acute angle relative to the substratum.

11. The modular barrier system of claim 10, wherein faces of the front wall and the rear wall of the body of the side members are contoured to be aligned against faces of the front wall or the rear wall of an adjacent side member when the side members are stacked face-to-face upon one another on the substratum.

12. The modular barrier system of claim 10, wherein the mating teeth each have a trapezoidal cross-section.

13. The modular barrier system of claim 10, wherein the mating teeth at the opposed side ends of the corner members are angled inwardly towards one another.

14. The modular barrier system of claim 10, wherein the mating teeth at the opposed side ends of the side members extend outwardly parallel to one another and parallel to respective central bodies.

15. The modular barrier system of claim 10, further including a liquid impermeable liner having a liner edge disposed over said side members, a resilient clip securing said liner edge to said barrier system, said resilient clip engaged with a top portion of a member to secure a liner edge to said barrier system, said resilient clip having an elongated U-shape with a flat bight extending to opposed legs for engagement with a laterally-extending recess at a top portion of a respective side member to trap the liner edge between the resilient clip and a respective top portion.

16. The modular barrier system of claim 10, further including a locking pin having a straight portion and an offset handle-lock, said straight portion of said locking pin being received in aligned openings of mating teeth of a pair of adjacent side or corner members, the locking pin being rotatable to dispose said handle-lock within an adjacent laterally-extending lock recess at a top portion of one of an adjacent side member or corner member.

17. The modular barrier system of claim 10, wherein at least one of the side members includes a support assembly for maintaining the side member at an acute angle relative to the sub stratum.

18. The modular barrier system of claim 17, wherein the support assembly includes an angled support member, and wherein the support assembly is moveable between a stowed position and a deployed position.

19. The modular barrier system of claim 17, wherein the front wall or the rear wall of the at least one of the side members is contoured to receive and retain the support assembly when the support assembly is in a stowed position when the plurality of side members are stacked upon one another on the substratum.

20. The modular barrier system of claim 17, wherein a thickness of the central bodies of the side members and of the corner members at the base walls is generally equal to a corresponding thickness at a top wall.

* * * * *